(12) United States Patent
Koarashi

(10) Patent No.: US 9,697,087 B2
(45) Date of Patent: Jul. 4, 2017

(54) STORAGE CONTROLLER TO PERFORM REBUILDING WHILE COPYING, AND STORAGE SYSTEM, AND CONTROL METHOD THEREOF

(71) Applicant: FUJITSU LIMITED, Kawasaki-shi, Kanagawa (JP)

(72) Inventor: Hiroshi Koarashi, Takaoka (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 14/559,389

(22) Filed: Dec. 3, 2014

(65) Prior Publication Data
US 2015/0234709 A1 Aug. 20, 2015

(30) Foreign Application Priority Data

Feb. 20, 2014 (JP) .................. 2014-030390

(51) Int. Cl.
*G06F 11/10* (2006.01)
*G06F 11/14* (2006.01)
*G06F 11/20* (2006.01)

(52) U.S. Cl.
CPC ...... *G06F 11/1451* (2013.01); *G06F 11/1092* (2013.01); *G06F 11/1088* (2013.01); *G06F 11/2056* (2013.01); *G06F 2201/84* (2013.01)

(58) Field of Classification Search
CPC ........... G06F 11/2058; G06F 2211/103; G06F 11/2089; G06F 11/1092; G06F 11/1076; G06F 11/1084; G06F 11/1088; G06F 11/2056; G06F 11/2053
See application file for complete search history.

(56) References Cited

U.S. PATENT DOCUMENTS

| | | | |
|---|---|---|---|
| 6,347,359 B1* | 2/2002 | Smith ................... | G06F 3/0604 711/111 |
| 7,685,463 B1* | 3/2010 | Linnell ............... | G06F 11/2094 714/5.1 |
| 2007/0294567 A1* | 12/2007 | Miyoshi ............... | G06F 11/008 714/6.21 |
| 2008/0126839 A1* | 5/2008 | Sangapu ............. | G06F 11/1092 714/5.11 |
| 2014/0053017 A1* | 2/2014 | Bartlett ............... | G06F 11/2089 714/6.21 |

FOREIGN PATENT DOCUMENTS

| | | |
|---|---|---|
| JP | 10-293658 | 11/1998 |
| JP | 2005-78430 | 3/2005 |

* cited by examiner

*Primary Examiner* — Joseph Schell
(74) *Attorney, Agent, or Firm* — Staas & Halsey LLP

(57) ABSTRACT

A storage controller includes a reconstruction unit that reconstructs data of a storage device to be restored among the plurality of storage devices by using data read from redundant storage devices other than the storage device to be restored among the plurality of storage devices, and stores the reconstructed data into a first backup storage device among the plurality of backup storage devices, and a copy unit that copies the data read from the redundant storage devices into second backup storage devices assigned to the redundant storage devices from among the plurality of backup storage devices during reconstruction by the reconstruction unit.

13 Claims, 14 Drawing Sheets

FIG. 3

| NO. | ITEM | CONTENT | REMARKS |
|---|---|---|---|
| 1 | LUN NAME | LUN1 | |
| 2 | LIST OF MEMBER DISK NAMES | (disk1, disk2, disk3, disk4) | |
| 3 | LOCATION AND SIZE ON EACH DISK | Offset VALUE, SIZE | |
| 4 | DEFECTIVE DISK NAME | disk2 | |
| 5 | STATE OF LUN | NORMAL OR IN REBUILDING OR REBUILT | |
| 6 | LIST OF USED BACKUP DISK NAMES | (disk1', disk2', disk3', disk4') or (–, disk2', disk3', –) | WHEN THERE ARE SMALLER NUMBER OF BACKUP DISKS |
| 7 | DISK STABILITY LIST | disk1, disk4, disk3 | DESCENDING ORDER |
| 8 | REBUILT SIZE | SIZE | INITIAL VALUE = 0 |
| 9 | READING/WRITING COUNTER OF SOURCE DISK | ((0, 0), (0, 0), (0, 0), (0, 0)) | (READ = n, WRITE = n) FOR SYNCHRONIZATION OF CHANGE IN RAID CONFIGURATION |
| 10 | READING/WRITING COUNTER OF BACKUP DISK | ((0, 0), (0, 0), (0, 0), (0, 0)) | |
| 11 | IO PROHIBIT FLAG OF SOURCE DISK | (0, 0, 0, 0) | FLAG FOR EACH DISK (1: PROHIBIT) FOR SYNCHRONIZATION OF CHANGE IN RAID CONFIGURATION |
| 12 | IO PROHIBIT FLAG OF BACKUP DISK | (0, 0, 0, 0) | |

61

STORAGE CONTROLLER TO PERFORM REBUILDING WHILE COPYING, AND STORAGE SYSTEM, AND CONTROL METHOD THEREOF

CROSS-REFERENCE TO RELATED APPLICATION

This application is based upon and claims the benefit of priority of the prior Japanese Patent Application No. 2014-030390, filed on Feb. 20, 2014, the entire contents of which are incorporated herein by reference.

FIELD

The embodiment discussed herein is related to a storage controller, a storage system.

BACKGROUND

Along with the widespread use of information and communication technology (ICT) systems, there has recently been widely used a disk array device using multiple storage devices (hereinafter collectively referred to as "disks") typified by hard disk drives (HDD). Such a disk array device generally uses redundant arrays of inexpensive disks (RAID) technology to secure the safety of data by redundantly recording the data in two or more disks.

Here, the RAID is a technology to manage multiple disks in combination as one virtual disk (RAID group). There are seven levels of RAID, RAID0 to RAID6, depending on data arrangement and redundancy on each disk.

A RAID device protects data from trouble with a disk included in the RAID by inserting parity data into a stripe across the multiple disks included in the RAID. The RAID configuration is assigned with a logical unit number (LUN), and thereby is perceived as a disk region and used by a server.

In a disk array device having redundant data, when a disk breaks down, data stored in the broken disk is rebuilt and stored in an alternative disk such as a backup disk. Such processing is generally called rebuilding. By executing rebuilding, data redundancy is recovered.

Such technologies have been described, for example, in Japanese Laid-open Patent Publications Nos. 10-293658 and 2005-78430.

However, in the case where such a conventional disk array device includes two or more LUNs on the RAID, for example, even if restoration of any of the LUNs is completed by the rebuilding, another disk failure within the RAID causes all the data in the RAID to be lost. As a result, the data in the restored LUN is also lost.

Also, when there are two or more LUNs on the RAID device, even the restored LUN operates under the influence of performance degradation due to the rebuilding until the complete rebuilding is finished.

SUMMARY

According to an aspect of the invention, a storage controller communicably connected to a plurality of storage devices having a redundant configuration and a plurality of backup storage devices through a communication path includes a reconstruction unit that reconstructs data of a storage device to be restored among the plurality of storage devices by using data read from redundant storage devices other than the storage device to be restored among the plurality of storage devices, and stores the reconstructed data into a first backup storage device among the plurality of backup storage devices, and a copy unit that copies the data read from the redundant storage devices into second backup storage devices assigned to the redundant storage devices from among the plurality of backup storage devices during reconstruction by the reconstruction unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a configuration of a LUN management table in the storage apparatus as an example of the embodiment;

DESCRIPTION OF EMBODIMENT

Figure 1:
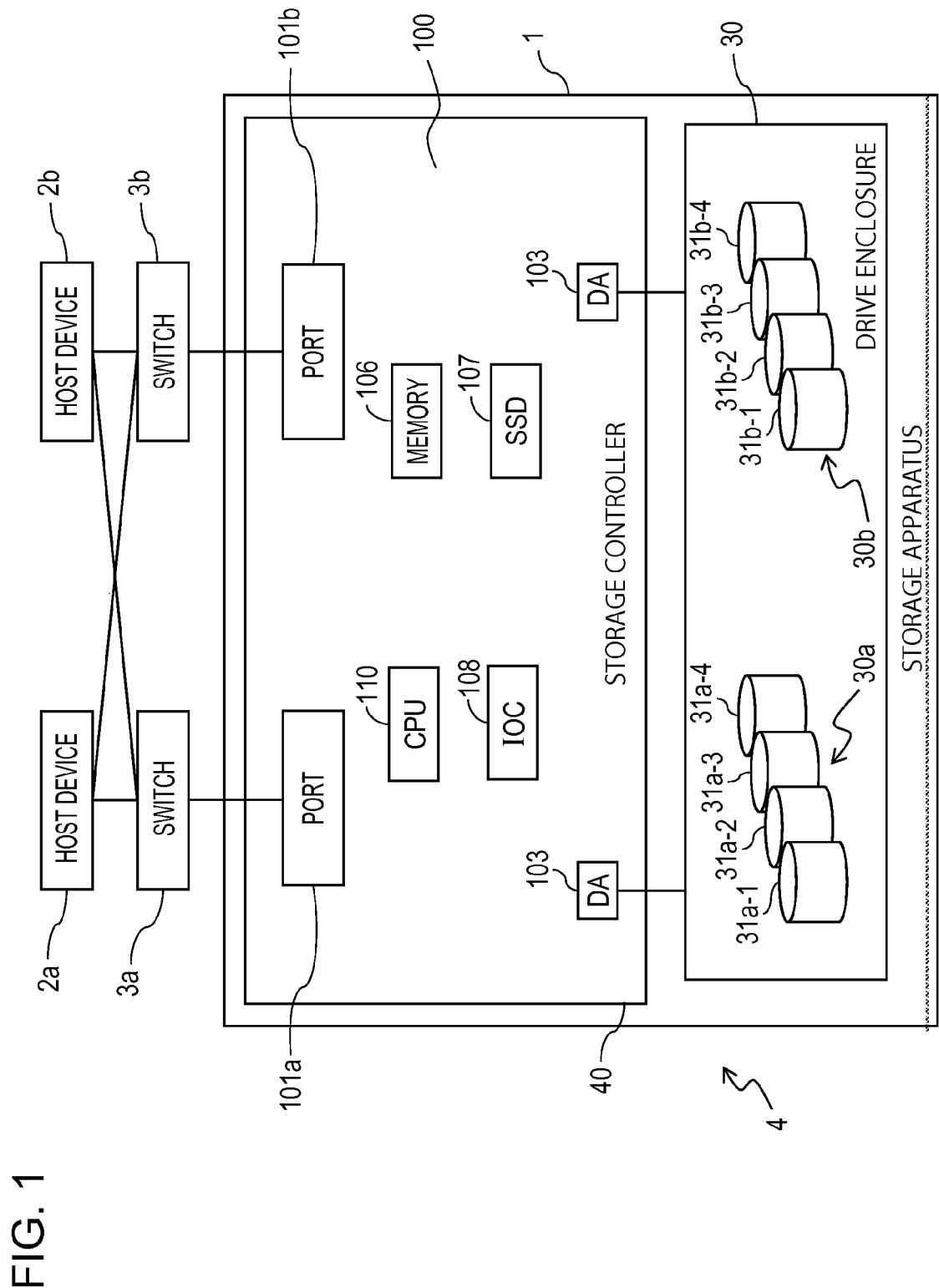
FIG. 1 is a diagram schematically illustrating a hardware configuration of a storage system including a storage apparatus as an example of an embodiment.

Hereinafter, with reference to the drawings, description is given of an embodiment relating to a storage controller, a storage system. However, the following embodiment is just an example and not intended to exclude various modified examples and applications of technology not specified in the embodiment. In other words, the embodiment may be implemented in various other forms without departing from the spirit of the embodiment. Moreover, the drawings are not intended to include only the constituent elements illustrated in the drawings but may include other functions and the like.

FIG. 1 is a diagram schematically illustrating a hardware configuration of a storage system 4 including a storage apparatus 1 as an example of the embodiment.

In the storage system 4, the storage apparatus 1 and one or more (two in the example illustrated in FIG. 1) host devices 2a and 2b are connected to each other through redundant paths.

The storage apparatus 1 forms a virtual storage environment by virtualizing storage devices 31 stored in a drive enclosure (DE) 30. The storage apparatus 1 provides the host devices 2a and 2b, which are higher-level devices, with virtual volumes.

The host devices 2a and 2b are information processing devices each including a server function, for example, and transmit and receive network attached storage (NAS) or storage area network (SAN) commands to and from the storage apparatus 1. The host devices 2a and 2b have the same configuration.

Hereinafter, as the reference numeral denoting the host device, reference numeral 2a or 2b is used in the case of specifying one of the multiple host devices, while reference numeral 2 is used in the case of indicating any one of the host devices.

The host device 2 includes a central processing unit (CPU) and a memory, which are not illustrated, and executes various functions by the CPU executing an operating system (OS) and a program, which are stored in the memory or the like.

The host device 2 transmits a disk access command, such as read and write, in the NAS to the storage apparatus 1, for example, to write and read data into and from the volume provided by the storage apparatus 1.

Then, in response to an input/output request (for example, a read command or write command) made to the volume by the host device 2, the storage apparatus 1 performs processing such as reading or writing of data on an actual storage corresponding to the volume. Note that the input/output request from the host device 2 may be described as an IO command.

Switches 3a and 3b are relay units that relay communication between the host devices 2a and 2b and a storage controller 100 in the storage apparatus 1. The switches 3a and 3b are connected to the host devices 2a and 2b, respectively, and also connected to the storage controller 100.

In the example illustrated in FIG. 1, the storage controller 100 includes two ports 101a and 101b. The switch 3a is connected to the port 101a, and the switch 3b is connected to the port 101b. The host devices 2a and 2b are connected to the switches 3a and 3b, respectively.

As illustrated in FIG. 1, the storage apparatus 1 includes one storage controller 100 or more (one in this embodiment) and one drive enclosure 30 or more (one in the example illustrated in FIG. 1).

The drive enclosure 30 is equipped with one or more (eight in the example illustrated in FIG. 1) storage devices (physical disks) 31a-1 to 31a-4 and 31b-1 to 31b-4, and provides the storage apparatus 1 with storage areas (actual volumes or actual storages) of the storage devices 31a-1 to 31a-4 and 31b-1 to 31b-4.

Hereinafter, as the reference numeral denoting the storage device, reference numerals 31a-1 to 31a-4 or 31b-1 to 31b-4 are used in the case of specifying one of the multiple storage devices, while reference numeral 31 is used in the case of indicating any one of the storage devices. Also, the storage device 31 may be described as the disk 31.

Moreover, hereinafter, the storage devices 31a-1, 31a-2, 31a-3, and 31a-4 may be described as disk1, disk2, disk3, and disk4, respectively. Likewise, hereinafter, the storage devices 31b-1, 31b-2, 31b-3, and 31b-4 may be described as disk1', disk2', disk3', and disk4', respectively.

The storage device 31 is a storage device such as a hard disk drive (HDD) and a solid state drive (SSD), and stores various kinds of data.

The drive enclosure 30 includes multiple levels of slots (not illustrated), for example, and may change, as appropriate, the size of the actual volume by inserting the storage devices 31 into the slots.

Moreover, the multiple storage devices 31 included in the drive enclosure 30 are used to construct redundant arrays of inexpensive disks (RAID). In the example illustrated in FIG. 1, the storage devices 31a-1 to 31a-4 are used to construct a RAID. The storage devices 31a-1 to 31a-4 are included in a RAID group 30a.

The storage devices 31a-1 to 31a-4 included in the RAID group 30a may be described as RAID member disks 31a.

The storage devices 31b-1 to 31b-4 are backup disks provided as a backup for a disk failure in a RAID disk group, and used as a hot spare (HS). The storage devices 31b-1 to 31b-4 are included in a backup disk group 30b. Hereinafter, the storage devices 31b may be described as the backup disks 31b.

The drive enclosure 30 is connected to device adapters (DAs) 103 and 103 in the storage controller 100.

A controller enclosure 40 includes one storage controller 100 or more (one in the example illustrated in FIG. 1).

The storage controller 100 is a storage controller configured to control operations within the storage apparatus 1, and performs various kinds of control, such as access control to the storage devices 31 in the drive enclosure 30, according to an IO command transmitted from the host device 2.

Note that, in the example illustrated in FIG. 1, the storage apparatus 1 includes one storage controller 100. However, the embodiment is not limited thereto, but the storage apparatus 1 may include two or more controllers 100. More specifically, a redundant configuration is constructed using multiple controllers 100, and any one of the controllers 100 normally serves as a primary controller to perform various kinds of control. In the event of trouble with the primary storage controller 100, a secondary storage controller 100 takes over the operations of the primary controller.

The storage controller 100 is connected to the host device 2 through the ports 101a and 101b. The storage controller 100 receives an IO command, such as read and write, transmitted from the host device 2, and controls the storage devices 31 through the Das 103 and the like.

As illustrated in FIG. 1, the storage controller 100 includes the ports 101a and 101b and the multiple (two in the example illustrated in FIG. 1) DAs 103 and 103, and also includes a CPU 110, a memory 106, an SSD 107 and an input output controller (IOC) 108.

Hereinafter, as the reference numeral denoting the port, reference numeral 101a or 101b is used in the case of specifying one of the multiple ports, while reference numeral 101 is used in the case of indicating any one of the ports.

The port 101 receives data transmitted from the host device 2 or the like, and transmits data outputted from the storage controller 100 to the host device 2 or the like. In other words, the port 101 controls input and output (I/O) of data to and from an external device such as the host device.

The port 101a is communicably connected to the host device 2 through the SAN, and is an FC port included in a network adapter such as a Fibre Channel (FC) interface, for example.

The port 101b is communicably connected to the host device 2 through the NAS, and is an NIC port of a local area network (LAN) interface, for example. The storage controller 100 is connected to the host device 2 and the like through a communication line by the ports 101, and performs reception of the I/O command, transmission and reception of data, and the like.

The switch 3a is connected to the port 101a, and the switch 3b is connected to the port 101b. Moreover, the host devices 2a and 2b are connected to the switches 3a and 3b, respectively.

More specifically, the host devices 2a and 2b are connected to the port 101a through the switch 3a and connected to the port 101b through the switch 3b.

Note that, in the example illustrated in FIG. 1, the storage controller 100 includes the two ports 101a and 101b. However, the embodiment is not limited thereto, but the storage controller 100 may include one or three or more ports.

The DAs 103 are interfaces for communicably connecting to the drive enclosure 30, the storage devices 31 and the like. The storage devices 31 in the drive enclosure 30 are connected to the DAs 103, and the storage controller 100 performs access control to the storage devices 31 based on the IO command received from the host device 2.

The storage controller 100 writes and reads data to and from the storage devices 31 through the DAs 103. In the example illustrated in FIG. 1, the storage controller 100 includes the two DAs 103. The drive enclosure 30 is connected to the DAs 103 in the storage controller 100. Thus, the storage controller 100 may write and read data to and from the storage devices 31 in the drive enclosure 30.

The SSD 107 is a storage device to store programs to be executed by the CPU 110, various kinds of data, and the like.

The memory 106 is a storage device to temporarily store various kinds of data and programs, and includes unillustrated memory region and cache region. The cache region temporarily stores data received from the host device 2 and data to be transmitted to the host device 2. The memory region is used to temporarily store and develop data and programs when the CPU 110 executes the programs.

The memory 106 stores a virtual/actual volume conversion table 62, disk configuration information 63, a RAID configuration table 64 and the like, which are used for RAID control performed by a RAID control unit 12 to be described later. The virtual/actual volume conversion table 62 is a table in which addresses of the virtual volumes to be provided to the host device 2 are mapped to physical addresses (real addresses) of the storage devices 31.

The disk configuration information 63 is information to manage the storage devices 31 included in the storage apparatus 1. In the disk configuration information 63, information is managed, such as disk types of the storage devices 31, to which slot in the drive enclosure 30 each of the storage devices 31 is attached, and which storage devices 31 are the backup disks 31, for example.

The RAID configuration table 64 is information used for RAID management performed by the RAID control unit 12 to be described later, and stores RAID types, information used to specify the storage devices 31a included in the RAID group 30a, and the like, for example.

Note that since the virtual/actual volume conversion table 62, the disk configuration information 63 and the RAID configuration table 64 are already known, detailed description thereof is omitted.

The memory 106 also temporarily stores data read from each source disk 31a for rebuilding when a rebuilding unit 13 to be described later performs rebuilding.

Furthermore, the memory 106 stores a LUN management table 61 to be described later. The LUN management table 61 is described in detail later.

The IOC 108 is a controller configured to control data transfer within the storage controller 100, and realizes direct memory access (DMA) transfer to transfer the data stored in the memory 106 without through the CPU 110.

The CPU 110 is a processing unit configured to carry out various kinds of control and operations, and is a multi-core processor (multi CPU), for example. The CPU 110 realizes various functions by executing the OS and programs stored in the SSD 107 and the like.

Figure 2:
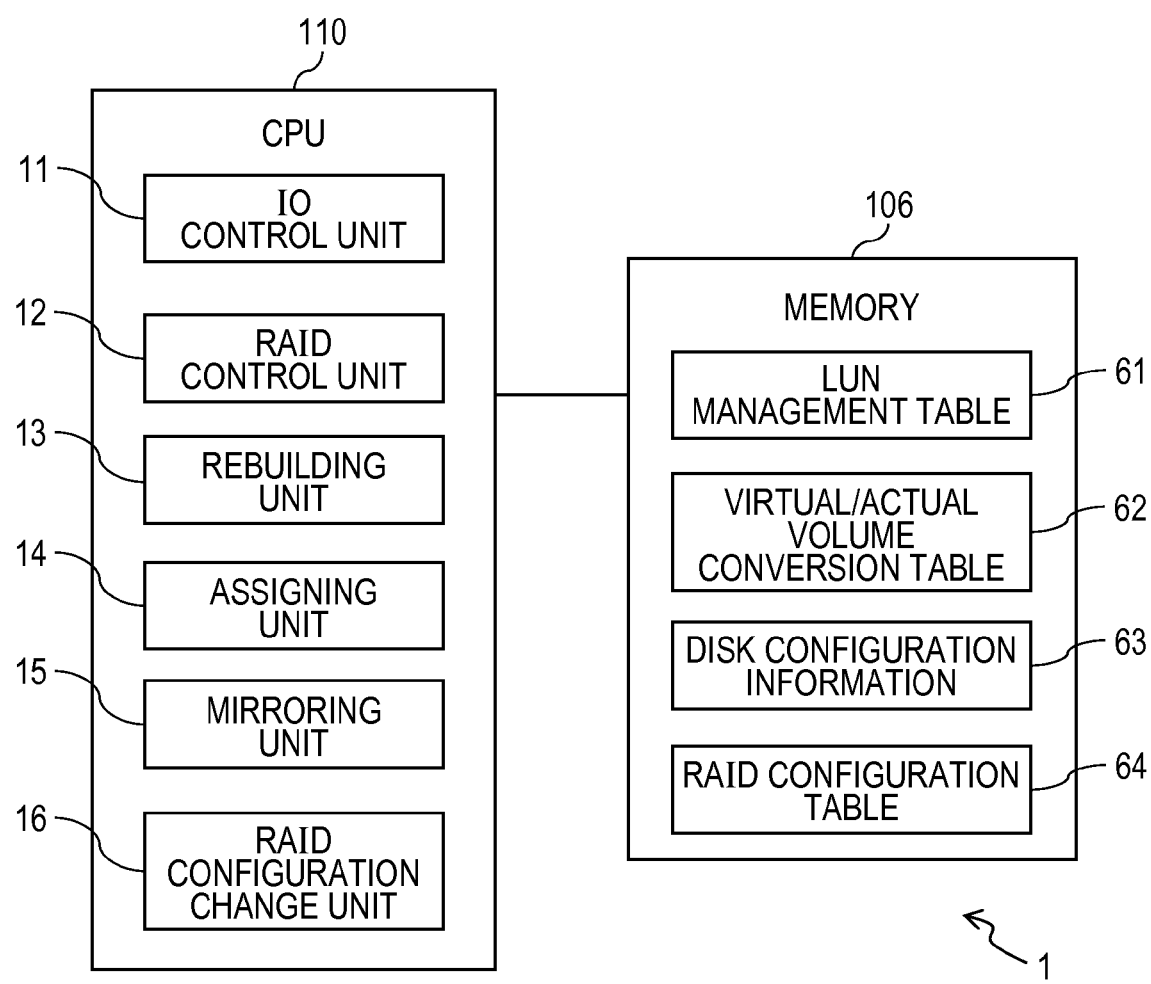
FIG. 2 is a diagram illustrating a functional configuration of the storage apparatus as an example of the embodiment.

FIG. 2 is a diagram illustrating a functional configuration of the storage apparatus 1 as an example of the embodiment.

As illustrated in FIG. 2, the storage apparatus 1 functions as an IO control unit 11, the RAID control unit 12, the rebuilding unit 13, an assigning unit 14, a mirroring unit 15, and a raid configuration change unit 16.

The CPU 110 in the storage controller 100 executes a control program to realize functions as the IO control unit 11, the RAID control unit 12, the rebuilding unit 13, the assigning unit 14, the mirroring unit 15, and the raid configuration change unit 16.

Note that the program (control program) to realize the functions as the IO control unit 11, the RAID control unit 12, the rebuilding unit 13, the assigning unit 14, the mirroring unit 15, and the raid configuration change unit 16 is provided as being recorded in a computer-readable recording medium such as a flexible disk, a CD (CD-ROM, CD-R, CD-RW or the like), a DVD (DVD-ROM, DVD-RAM, DVD-R, DVD+R, DVD-RW, DVD+RW, HD DVD or the like), a Blu-ray disc, a magnetic disk, an optical disk, and a magnetooptical disk. A computer reads the program from the recording medium and uses the program by transferring the program to an internal storage device or an external storage device and storing the program therein. Alternatively, the program may be recorded in a storage device (recording medium) such as the magnetic disk, optical disk or magnetooptical disk, for example, and provided to the computer from the storage device through a communication path.

In realizing the functions as the IO control unit 11, the RAID control unit 12, the rebuilding unit 13, the assigning unit 14, the mirroring unit 15, and the raid configuration change unit 16, a program stored in the internal storage device (the SSD 107 and the memory 106 in this embodiment) is executed by a microprocessor (the CPU 110 in this embodiment) in the computer. In this event, the computer may read and execute the program recorded in the recording medium.

The RAID control unit 12 uses the storage devices 31a to realize a RAID, and controls the storage devices 31 included in the RAID. More specifically, the RAID control unit 12 sets a redundant configuration using the multiple storage devices 31a.

The RAID control unit 12 creates and manages the RAID configuration table 64 described above, sets the RAID group 30a using the RAID member disks 31a, and performs various kinds of RAID control. Note that the RAID management by the RAID control unit 12 may be realized by an already-known method, and thus description thereof is omitted.

The RAID control unit 12 also uses the storage devices 31 to set and manage a LUN, and the host device 2 performs data access to the set LUN. The RAID control unit 12 uses the LUN management table 61 to manage the LUN.

FIG. 3 is a diagram illustrating a configuration of the LUN management table 61 in the storage apparatus 1 as an example of the embodiment.

The LUN management table 61 is management information provided for each LUN. The LUN management table 61 in FIG. 3 illustrates information about LUN1.

In the LUN management table 61, items, contents and remarks are associated with each other. In the example illustrated in FIG. 3, twelve items are registered in the LUN management table 61 and item numbers 1 to 12 are set to specify the items.

To be more specific, as the items, LUN name, list of member disk names, location and size on each disk, defective disk name, state of LUN, list of used backup disk names, disk stability list, rebuilt size, reading/writing counter of source disk, reading/writing counter of backup disk, IO prohibit flag of source disk, and IO prohibit flag of backup disk are registered. The numbers (item numbers) 1 to 12 are assigned thereto, respectively.

In the LUN name of Item 1, identification information for specifying the LUN is registered. In the example illustrated in FIG. 3, "LUN1" is registered. In the list of member disk names of Item 2, information indicating the storage devices 31 included in the LUN is registered. In other words, information indicating the RAID member disks 31a is stored in the list of member disk names. In the example illustrated in FIG. 3, disk1, disk2, disk3, and disk4 are registered in the list of member disk names.

In the location and size on each disk of Item 3, information indicating the storage location and size of the LUN data on each of the RAID member disks 31a included in the LUN is registered. Note that an offset value, for example, is registered as the location.

In the defective disk name of Item 4, information indicating the storage device 31a detected to be defective among the RAID member disks 31a included in the LUN is registered. In the example illustrated in FIG. 3, "disk2" is registered.

In the state of LUN of Item 5, information indicating the state of the LUN is stored. In the example illustrated in FIG. 3, any of "normal" indicating a normal state, "in rebuilding" indicating that the LUN is being rebuilt, and "rebuilt" indicating that the LUN is rebuilt is stored.

In the list of used backup disk names of Item 6, information indicating the backup disks 31b associated with the respective RAID member disks 31a is stored. Note that the backup disks 31b associated with the RAID member disks 31a are set by the assigning unit 14 to be described later.

In the example illustrated in FIG. 3, disk1', disk2', disk3', and disk4' are associated with disk1, disk2, disk3, and disk4 in the list of member disk names of Item 2. More specifically, disk1 is paired with disk1'. Likewise, disk2, disk3, and disk4 are paired with disk2', disk3', and disk4', respectively.

When there are a small number of backup disks 31b that may be assigned to the RAID member disks 31a, the backup disks 31b are assigned to only some of the RAID member disks 31a, as described later. FIG. 3 also illustrates an example of such a case with a small number of backup disks 31b. In FIG. 3, only the assigned backup disks 31b are illustrated, and horizontal lines (-) are drawn in portions with no backup disks 31b to be assigned.

In the disk stability list of Item 7, information indicating the RAID member disks 31a included in the LUN is registered in descending order of stability. In the example illustrated in FIG. 3, the RAID member disks 31a are registered in the order of disk1, disk4, and disk3. Note that, since disk2 is broken, disk2 is not registered in the disk stability list.

In the rebuilt size of Item 8, a total value (data size) of data restored when rebuilding is executed for the defective disk of Item 2 is registered as the progress. An initial value of the rebuilt size is 0, and the value thereof is increased as the rebuilding proceeds.

In the reading/writing counter of source disk of Item 9, the number of read accesses and write accesses in execution is stored for each of the RAID member disks (source disks) 31a included in the LUN. More specifically, an IO access state to each of the RAID member disks 31a is indicated in real time.

In the example illustrated in FIG. 3, a reading counter value n and a writing counter value n are indicated in the form of (n, n) for each of the RAID member disks 31a.

Upon receipt of an IO command of a read request or write request to the LUN from the host device 2, the IO control unit 11 to be described later, for example, increments the value of the reading counter or writing counter for the access destination RAID member disk 31a. Upon completion of the read access or write access, the IO control unit 11 decrements the value of the corresponding counter.

By referring to the reading/writing counter value of the source disk, it may be determined whether or not the IO processing is being executed by each of the RAID member disks 31a.

In the reading/writing counter of backup disk of Item 10, the number of read accesses and write accesses in execution is stored for each of the backup disks 31b. More specifically, an IO access state to each of the backup disks 31b is indicated.

In the example illustrated in FIG. 3, a reading counter value n and a writing counter value n are indicated in the form of (n, n) for each of the backup disks 31b.

For example, the mirroring unit 15 to be described later increments the writing counter value in writing of data to the backup disk 31b. The mirroring unit 15 also decrements the value of the corresponding counter upon completion of the writing.

By referring to the reading/writing counter value of the backup disk, it may be determined whether or not the IO processing is being executed by each of the backup disks 31b.

In the IO prohibit flag of source disk of Item 11, information indicating whether or not IO processing is prohibited is stored for each of the RAID member disks 31a included in the LUN. In the example illustrated in FIG. 3, "0" or "1" is stored. When "1" is set as the flag, it means that IO to the RAID member disk 31a is prohibited.

In the IO prohibit flag of backup disk of Item 12, information indicating whether or not IO processing is prohibited is stored for each of the backup disks 31b. In the example illustrated in FIG. 3, "0" or "1" is stored. When "1" is set as the flag, it means that IO to the backup disk 31b is prohibited.

The rebuilding unit 13 executes and controls rebuilding upon detection of trouble with any of the disks 31a, for example. Hereinafter, the disk 31a detected to be defective may be described as the defective disk 31a. This defective disk 31a corresponds to a storage device to be restored. Note that it is determined that there is trouble with the disk 31a when a predetermined error such as a medium error, for example, occurs at a frequency set as a threshold, or more.

The rebuilding is processing of automatically recovering the redundancy of the RAID group. In the rebuilding, when there is trouble with the storage device 31a belonging to the RAID group, the data in the defective disk 31a is rebuilt using the data in the storage device 31a other than the defective disk 31a in the same RAID group for the backup disk (alternative disk, first backup storage device) 31b to be alternatively used. Hereinafter, the storage device (redundant storage device) 31a other than the defective disk 31a in the same RAID group may be described as the rebuilding source disk 31a. Also, the rebuilding source disk may be simply described as the source disk.

Upon detection of the defective disk 31a, the rebuilding unit 13 uses the data of the rebuilding source disk 31a other than the defective disk 31a to rebuild the data of the defective disk 31a in the alternative disk (rebuilding destination disk) 31b alternative to the defective disk 31a.

As described above, the rebuilding unit 13 functions as a reconstruction unit to reconstruct the data of the defective disk 31a in the backup disk (first backup storage device) by using the redundant data read from the rebuilding source disk (redundant storage device) 31a other than the defective disk (storage device to be restored) 31a among the multiple RAID member disks 31a.

The restoration of the data of the defective disk 31a by the rebuilding unit (data restoration unit) 13 may be realized by an already known method.

The multiple storage devices 31a included in the same RAID group 30a are made redundant by distributing and copying the data of each of the storage devices 31a to the other storage devices (redundant storage devices) 31a.

The rebuilding unit 13 restores the data of the defective disk 31a in the alternative disk 31b (data disk construction) by reading the data stored in each of the multiple storage devices (redundant storage devices) 31a included in the same RAID group as the defective disk 31a and storing the read data in the alternative disk 31b.

Figure 4:
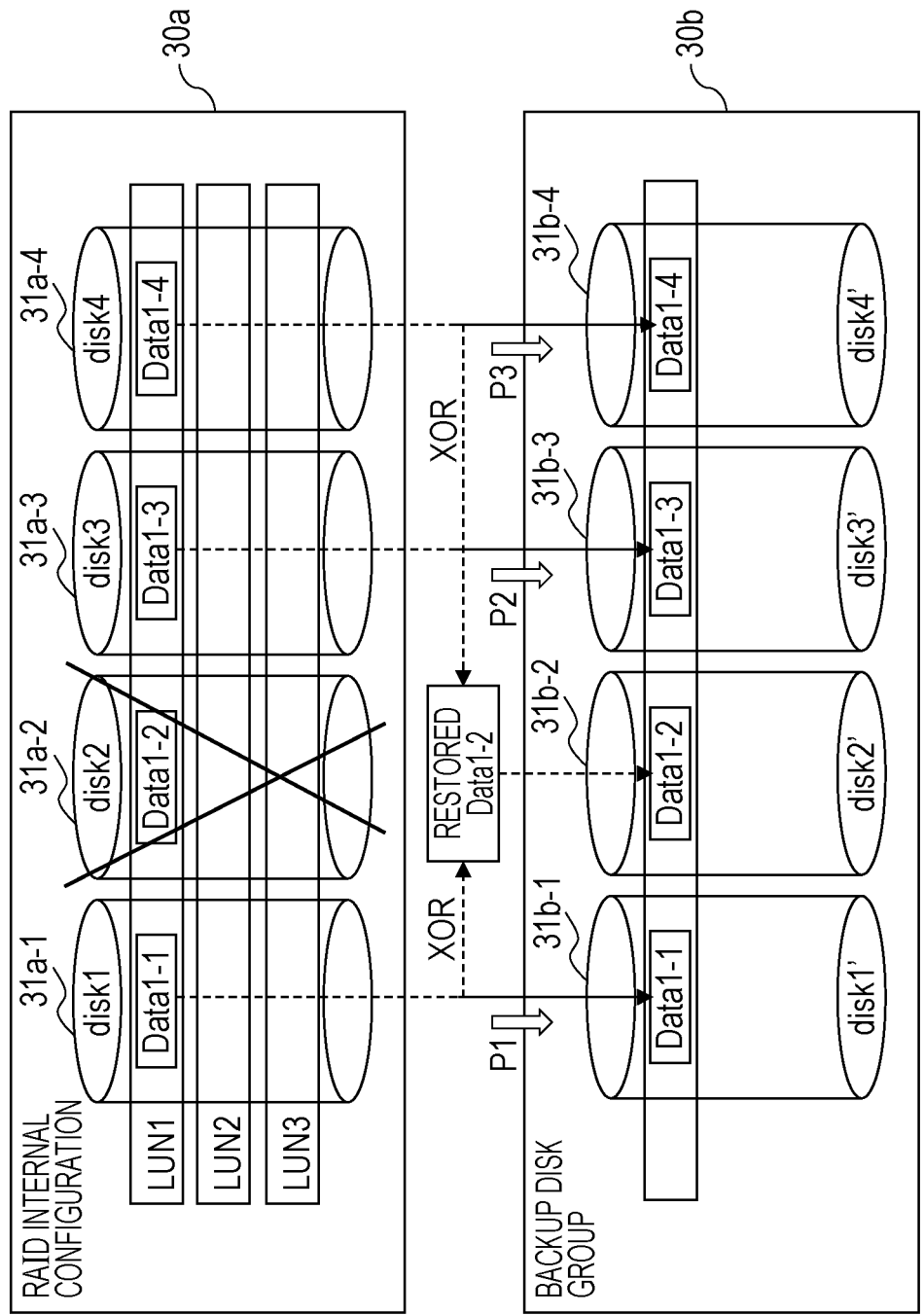
FIG. 4 is a diagram explaining rebuilding in the storage apparatus as an example of the embodiment.

FIG. 4 is a diagram explaining the rebuilding in the storage apparatus 1 as an example of the embodiment. In the example illustrated in FIG. 4, the RAID group 30a realizes RAID5 using four (3+1) RAID member disks 31a-1 to 31a-4. The following description is given of a case where there is trouble with the disk 31a-2 among the RAID member disks 31a-1 to 31a-4.

Moreover, in the example illustrated in FIG. 4, the disks 31a-1 to 31a-4 in the RAID group 30a are used to form three LUNs, LUN1 to LUN3. The following description is given of an example of restoring data (Data1-2) of LUN1 among the three LUNs.

Upon detection of trouble with the disk 31a-2, the rebuilding unit 13 uses the data (Data1-1, 1-3, and 1-4) of the rebuilding source disks 31a-1, 31a-3, and 31a-4 to create data (restored Data1-2) of the defective disk 31a-2 (see broken lines in FIG. 4).

Then, the defective disk 31a-2 is reconstructed by storing the created data (restored Data1-2) of the defective disk 31a-2 in an alternative disk (rebuilding destination disk) 31b-2 alternative to the defective disk 31a-2.

When two or more LUNs are formed in the RAID group 30a, the rebuilding unit 13 performs the rebuilding for each LUN. Moreover, in the case of rebuilding for multiple LUNs, the rebuilding unit 13 manages the progress of the rebuilding by using a list (not illustrated) of the LUNs and a pointer indicating the progress of rebuilding in the list.

During the rebuilding by the rebuilding unit 13, the mirroring unit (copy unit) 15 stores data read from each of the rebuilding source disks (redundant storage devices) 31a in the RAID group 30a in the backup disk (second backup storage device) 31b assigned to each of the rebuilding source disks 31a. Thus, the mirroring unit 15 makes a copy of each rebuilding source disk 31a to the backup disk 31b.

In the example illustrated in FIG. 4, the backup disk 31b-1 is associated with the rebuilding source disk 31a-1, the backup disk 31b-3 is associated with the rebuilding source disk 31a-3, and the backup disk 31b-4 is associated with the rebuilding source disk 31a-4. Note that such association between the rebuilding source disks 31a and the backup disks 31b is performed by the assigning unit 14 to be described later.

The mirroring unit 15 makes a copy of the rebuilding source disk 31a to the backup disk 31b by storing (making a dead copy of) data, which is read from the rebuilding source disk (redundant storage device) 31a in the RAID group 30a and stored in the memory 106, in the corresponding backup disk 31b.

More specifically, in the example illustrated in FIG. 4, the data (Data1-1, 1-3, and 1-4) of the rebuilding source disks 31a-1, 31a-3, and 31a-4 in LUN1 are copied to the backup disks 31b-1, 31b-3, and 31b-4, respectively (see arrows P1 to P3).

The assigning unit 14 associates the backup disks 31b with the rebuilding source disks 31a. Hereinafter, associating the backup disks 31b with the rebuilding source disks 31a may be expressed as "assigning".

Moreover, the disk 31b that is not associated with any of the RAID member disks 31a, among the backup disks 31b, is particularly described as the unassigned backup disk 31b.

In the example illustrated in FIG. 4, the backup disks 31b are associated with the rebuilding source disks 31a, respectively.

However, there is also a case where the number of usable backup disks 31b falls short of the number of the rebuilding source disks 31a and thus the backup disks 31b may not be associated with all the rebuilding source disks 31a. In such a case, the assigning unit 14 assigns the backup disks 31b to only some of the rebuilding source disks 31a.

The assigning unit 14 determines the number of backup disks 31b to be used for rebuilding by referring to the RAID size (P), the number of spare disks (m) and a limit value (L).

Here, the RAID size (P) is the number of the storage devices 31a included in the RAID realized by the RAID group 30a, and is determined based on the RAID type. In the case of RAID5, for example, the RAID size is 4 (3+1) (P=4). The RAID size is also the number of the RAID member disks 31a.

The number of spare disks (m) is the number of usable backup disks 31b, and can be confirmed by referring to the disk configuration information 63, for example. The limit value (L) is the minimum number of the backup disks 31b to be used for rebuilding when the number of the backup disks 31b (m) is less than the RAID size (P), for example. When the limit value L=2, for example, it means that two backup disks 31b are used for rebuilding. The limit value (L) is previously set by an administrator or the like.

When the number of backup disks (m) is less than the RAID size (P), the assigning unit 14 assigns the backup disks 31b preferentially to the rebuilding source disks 31a with low stability, in other words, unstable rebuilding source disks 31a. The assigning unit 14 may find the rebuilding source disk 31a with low stability, in other words, most unstable rebuilding source disk 31a by referring to the disk stability list of Item 7 in the LUN management table 61, for example.

Figure 5:
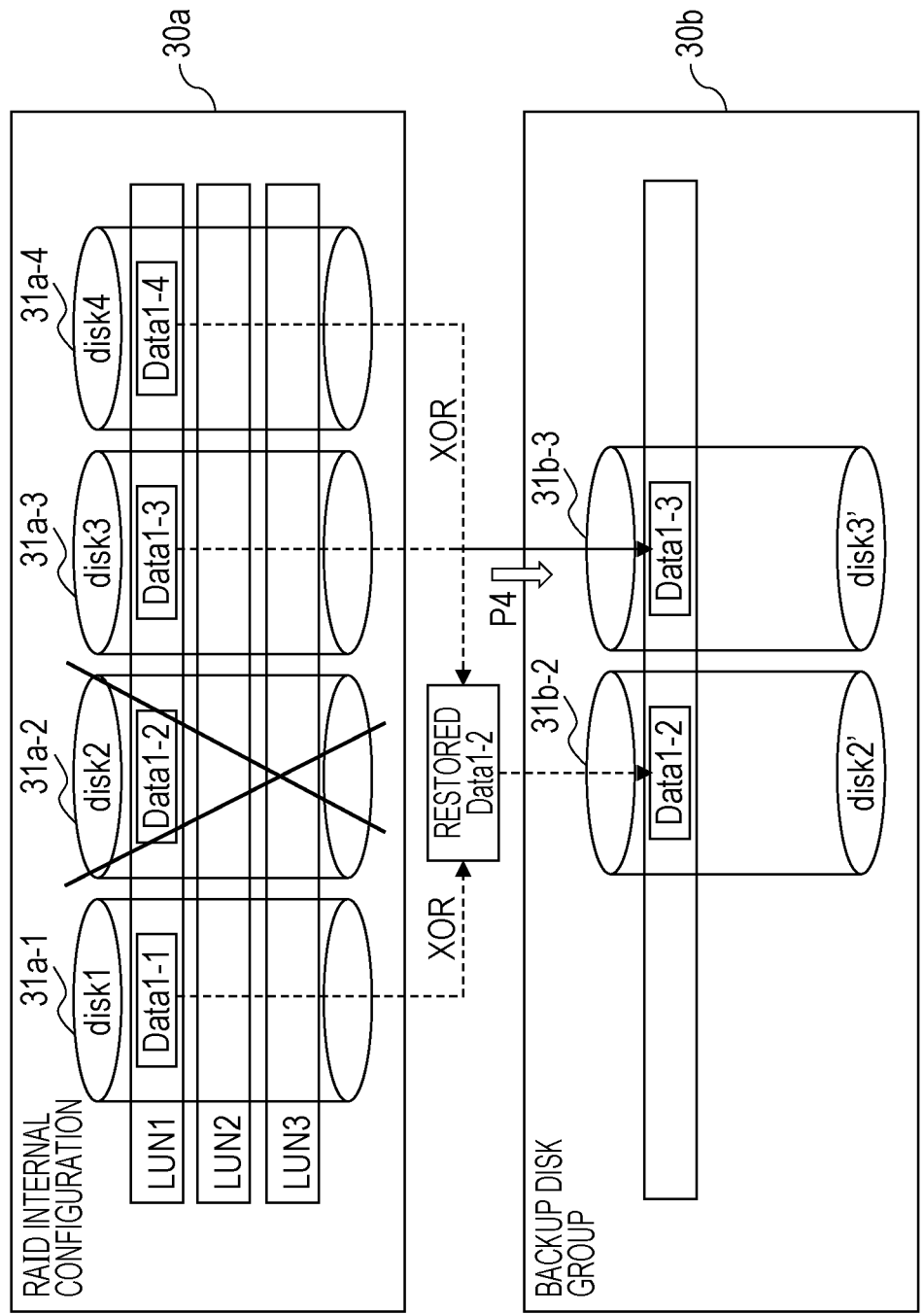
FIG. 5 is a diagram explaining rebuilding in the storage apparatus as an example of the embodiment.

FIG. 5 is a diagram explaining the rebuilding in the storage apparatus 1 as an example of the embodiment. FIG. 5 illustrates an example where the backup disks 31b are associated with only some of the rebuilding source disks 31a.

In the example illustrated in FIG. 5, there is trouble with the RAID member disk 31a-2, and data of the RAID member disk 31a-2 is restored in the alternative disk 31b-2 by rebuilding (see broken lines in FIG. 5).

The backup disk 31b-3 is associated with only the rebuilding source disk 31a-3 among the rebuilding source disks 31a-1, 31a-3, and 31a-4, while no backup disk 31b is associated with the other rebuilding source disks 31a-1 and 31a-4.

When the backup disk 31b may not be assigned to all of the rebuilding source disks 31a, the assigning unit 14 assigns the backup disk 31b to only some of the rebuilding source disks 31a with low stability.

As described above, when the backup disk 31b is assigned to only some of the rebuilding source disk 31a with low stability, the mirroring unit 15 copies the data of the rebuilding source disk 31a, to which the backup disk 31b is assigned, to the backup disk 31b assigned to the rebuilding source disk 31a.

In the example illustrated in FIG. 5, the LUN1 data (Data1-3) of the rebuilding source disk 31a-3 is copied to the backup disk 31b-3 (see arrow P4).

More specifically, during the rebuilding by the rebuilding unit 13, the mirroring unit 15 stores (makes a dead copy of) the data, which is read from the rebuilding source disk 31a-3 and stored in the memory 106, in the corresponding backup disk 31b-3. Thus, the data of the rebuilding source disk 31a-3 is copied to the backup disk 31b-3.

The backup disks 31b assigned as spares are used as unassigned backup disks 31b by unassigning the backup disks 31b from the one with which a stable RAID member disk 31a is paired, when there are not enough backup disks 31b due to another trouble with the RAID in the system, even if the rebuilding is not completed.

The IO control unit 11 performs IO control for the LUN. The IO control unit 11 performs IO control using Fibre Channel Protocol (FCP) or NAS for the LUN, for example.

The IO control unit 11 uses the virtual/actual volume conversion table 62 described above to perform IO processing on the storage device 31 that is the actual volume in response to an IO request from the host device 2. In response to the IO request transmitted from the host device 2, the IO control unit 11 reads and writes data from and to the storage devices 31 included in the LUN.

Figure 6:
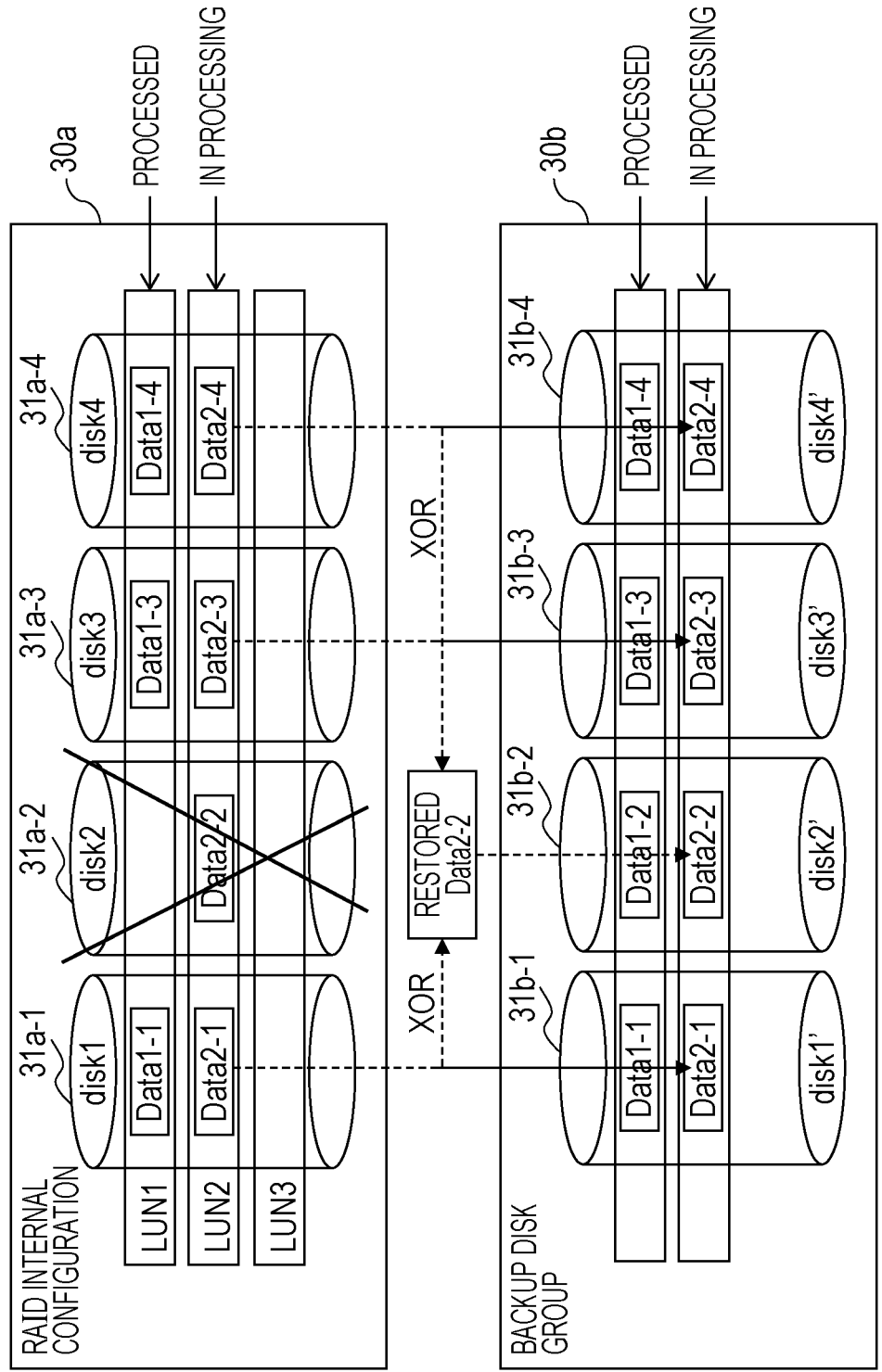
FIG. 6 is a diagram explaining rebuilding in the storage apparatus as an example of the embodiment.

FIG. 6 is a diagram explaining rebuilding in the storage apparatus 1 as an example of the embodiment. In the example illustrated in FIG. 6, as in the case of FIG. 4, the RAID group 30a realizes RAID5 using four RAID member disks 31a-1 to 31a-4, and the data of the defective disk 31a-2 is reconstructed in the alternative disk 31b-2. Particularly, FIG. 6 illustrates a state in rebuilding of LUN2 after the state illustrated in FIG. 4 and completion of the rebuilding of LUN1.

The rebuilding unit 13 uses LUN2 data (Data2-1, 2-3, and 2-4) of the rebuilding source disks 31a-1, 31a-3, and 31a-4 to create LUN2 data (restored Data2-2) of the defective disk 31a-2. Then, the rebuilding unit 13 stores the created LUN2 data (restored Data2-2) of the defective disk 31a-2 in the alternative disk 31b-2 alternative to the defective disk 31a-2 (see broken lines in FIG. 6).

Accordingly, the mirroring unit 15 copies the LUN2 data (Data2-1, 2-3, and 2-4) of the rebuilding source disks (redundant storage devices) 31a-1, 31a-3, and 31a-4 to the backup disks 31b-1, 31b-3, and 31b-4, respectively.

In the state illustrated in FIG. 6, when there is an IO request to the rebuilt LUN1 from the host device 2, the IO control unit 11 performs the IO processing using disk data regions of both the RAID member disks 31a in the RAID group 30a and the backup disks 31b in the backup disk group 30b.

To be more specific, when read access to the LUN1 data is performed, reading is performed using both of the RAID member disks 31a in the RAID group 30a and the backup disks 31b in the backup disk group 30b. For example, the IO control unit 11 performs the reading by alternately selecting the RAID member disks 31a in the RAID group 30a and the backup disks 31b in the backup disk group 30b in round-robin fashion.

The rebuilt LUN1 data exists in both the RAID group 30a and the backup disk group 30b, and is duplexed.

As to the reading, the data may be read from any one of the RAID member disks 31a in the RAID group 30a and the backup disks 31b in the backup disk group 30b. In the storage apparatus 1, data read is performed using both of the RAID group 30a and the backup disk group 30b, in response to a read request from the host device 2. More specifically, data reading performance is improved by enabling parallel execution of multiple data reads. At the same time, the life of the storage devices 31 may be extended by dispersing disk access load.

To be more specific, high storage accessibility can be realized even in rebuilding by performing the reading by alternately selecting the RAID member disks 31a in the RAID group 30a and the backup disks 31b in the backup disk group 30b in round-robin fashion.

Meanwhile, when write access to the LUN1 data is performed, writing is performed to both the RAID member disks 31a in the RAID group 30a and the backup disks 31b in the backup disk group 30b.

As described above, the writing is preferably performed to both the RAID member disks 31a in the RAID group 30a and the backup disks 31b in the backup disk group 30b. However, in the storage device, reading is generally performed more often than writing. It is said that read:write=about 2:1. Thus, it is considered that redundant writing is less likely to affect the storage accessibility as a whole.

Note that when the host device 2 issues an IO command to the LUN2 and LUN3, of which rebuilding is not completed, in the state illustrated in FIG. 6, the IO control unit 11 performs IO processing using a disk data region of the RAID member disks 31a in the RAID group 30a.

When read access to the LUN2 data is performed, for example, the IO control unit 11 performs reading from the RAID member disks 31a in the RAID group 30a. Meanwhile, reading from the defective disk 31a-2 is performed by restoring data of the defective disk 31a-2 by performing an XOR operation using parity on the data of the rebuilding source disks (redundant storage devices) 31a-1, 31a-3, and 31a-4 other than the defective disk 31a-2.

When write access to the LUN2 data is performed, the IO control unit 11 performs writing to the RAID member disks 31a in the RAID group 30a. Meanwhile, as to writing to the defective disk 31a-2, data of the defective disk 31a-2 is restored by performing an XOR operation using parity on the data of the rebuilding source disks (redundant storage devices) 31a-1, 31a-3, and 31a-4 other than the defective disk 31a-2. Then, the restored data is used to perform writing to the alternative disk 31b-2 in the backup disk group 30b.

When there is an unstable rebuilding source disk 31a in the RAID group 30a after completion of the rebuilding by the rebuilding unit 13, the RAID configuration change unit 16 reconstructs the RAID configuration by replacing the unstable rebuilding source disk 31a with the backup disk 31b.

More specifically, the RAID configuration change unit 16 functions as a redundant configuration change unit to change the RAID configuration by replacing the rebuilding source disk 31a with the backup disk 31b, to which the rebuilding source disk 31a with low stability is copied, after the completion of the rebuilding by the rebuilding unit 13.

Whether or not the rebuilding source disk 31a is unstable is determined based on storage statistical information (log information), for example. When the number of predetermined errors detected in the storage statistical information is not less than a threshold, it may be determined that the rebuilding source disk 31a is unstable.

As the storage statistical information, the number of medium errors or the number of seek errors in each of the RAID member disks 31a, for example, can be used. Such storage statistical information can be acquired by referring to firmware or the like of each disk 31a, for example.

Upon completion of the rebuilding of all the LUNs by the rebuilding unit 13, the RAID configuration change unit 16 reconstructs the configuration so as to achieve a more stable RAID configuration by checking the reliability of the RAID member disk 31a included in defective RAID, in which trouble is detected, and the backup disk 31b paired therewith.

Note that, when it is preferable to maintain installation locations of disk groups included in the original RAID, the RAID member disks 31a in the original RAID may be continuously used if there is no problem therewith.

Figure 7:
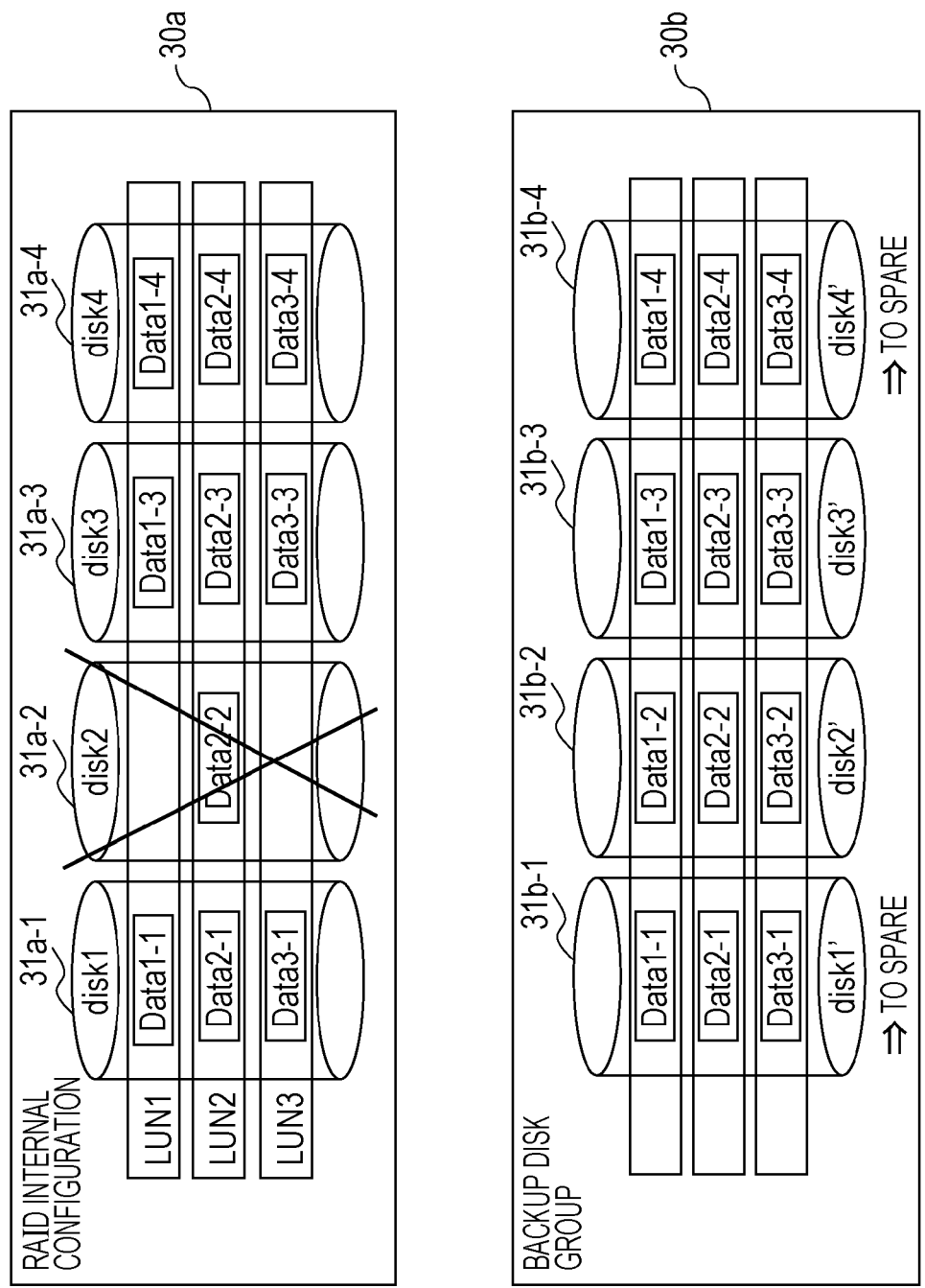
FIG. 7 is a diagram illustrating a method for changing a RAID configuration by a RAID configuration change unit in the storage apparatus as an example of the embodiment.

FIG. 7 is a diagram illustrating a method for changing the RAID configuration by the RAID configuration change unit 16 in the storage apparatus 1 as an example of the embodiment.

In the example illustrated in FIG. 7, again, as in the case of FIG. 4, the RAID group 30a realizes RAID5 using four RAID member disks 31a-1 to 31a-4, and the defective disk 31a-2 is reconstructed in the alternative disk 31b-2. Particularly, FIG. 7 illustrates a state after the state illustrated in FIG. 6 and completion of the rebuilding of LUN2 and LUN3.

More specifically, the data of the RAID member disks 31a-1, 31a-3, and 31a-4 is copied to the backup disks 31b-1, 31b-3, and 31b-4, respectively, by the mirroring unit 15.

The example in FIG. 7 illustrates a state where the RAID member disk 31a-3 is determined to be unstable.

When the RAID member disk 31a-3 is determined to be unstable after the completion of the rebuilding, the RAID configuration change unit 16 reconstructs the RAID configuration by replacing the RAID member disk 31a-3 with the backup disk 31b-3 to which the data of the RAID member disk 31a-3 is copied.

Note that switching from the RAID member disk 31a-3 to the backup disk 31b-3 may be realized using already known various methods. For example, the RAID configuration change unit 16 switches the RAID member disk 31a-3 to the backup disk 31b-3 by issuing a command to set the RAID member disk 31a-3 determined to be unstable in a fail state.

Meanwhile, when there are two or more RAID member disks 31a determined to be unstable, those RAID member disks 31a are also similarly switched to the backup disks 31b.

Moreover, after the completion of the rebuilding, the RAID configuration change unit 16 returns the backup disks 31b corresponding to the RAID member disks 31a determined not to be unstable to the unassigned backup disks 31b. Thus, the storage devices 31 installed as the backup disks 31b in the slots in the drive enclosure 30 may be actively used as the backup disks 31b, thereby facilitating management thereof. In the example illustrated in FIG. 7, the backup disks 31b-1 and 31b-4 are returned to the free unassigned backup disks 31b, and the association with the RAID member disks 31a is released.

Figure 8:
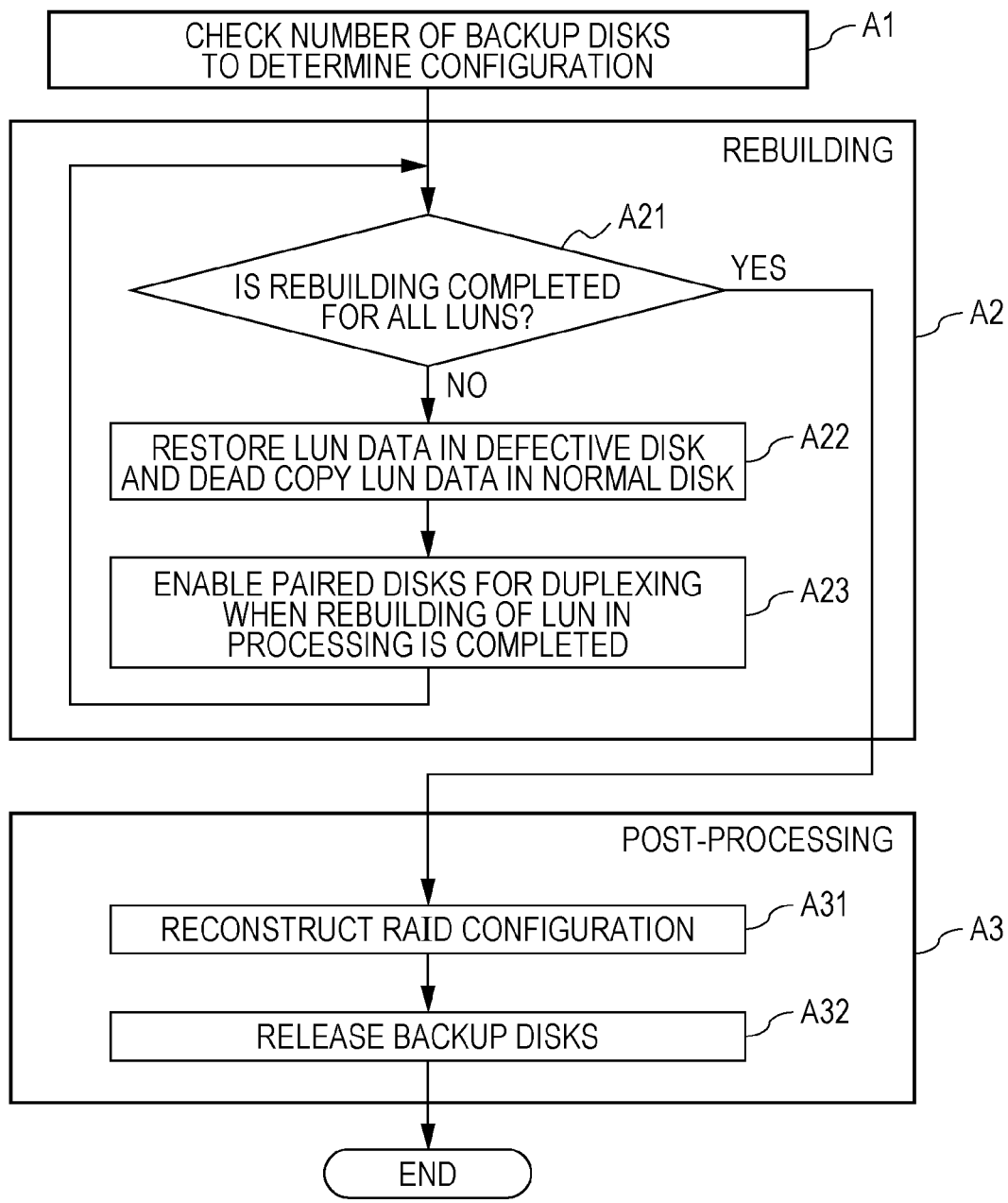
FIG. 8 is a flowchart illustrating an overview of rebuilding in the storage apparatus as an example of the embodiment.

With reference to a flowchart (Steps A1 to A3) illustrated in FIG. 8, description is given of an overview of the rebuilding in the storage apparatus 1 as an example of the embodiment configured as described above.

In Step A1, the assigning unit 14 checks the number of usable backup disks 31b to determine a storage configuration. Note that a method for determining the storage configuration is described in detail later with reference to FIG. 9.

In Step A2, the rebuilding unit 13 performs rebuilding of the defective disk 31. First, in Step A21, the rebuilding unit 13 checks if rebuilding is completed for all the LUNs included in the RAID group 30a. When the rebuilding is not completed for all the LUNs (see NO route in Step A21), the rebuilding unit 13 restores the data of the defective disk 31 in Step A22. During the rebuilding, the mirroring unit 15 makes a dead copy of data read from the rebuilding source disk 31a to the corresponding backup disk 31b. Thus, the rebuilding source disk 31a is copied to the backup disk 31b.

In Step A23, upon completion of the rebuilding of the LUNs in processing, the paired RAID member disk 31a and backup disk 31b are enabled by duplexing. When a read request is received from the host device 2, for example, reading is alternately performed in round-robin fashion from the paired RAID member disk 31a and backup disk 31b. Meanwhile, when a write request is received from the host device 2, writing is performed to both of the paired RAID member disk 31a and backup disk 31b. Thereafter, the processing returns to Step A21.

Note that the rebuilding is described in detail later with reference to FIGS. 10 and 11.

After the processing for all the LUNs is completed in Step A21 (see YES route in Step A21), the processing moves to processing after the rebuilding, that is, post-processing (Step A3).

In the post-processing, in Step A31, the RAID configuration change unit 16 reconstructs the RAID configuration by using the backup disk 31b instead of the RAID member disk 31a having trouble detected therein.

When there is an unstable RAID member disk 31a in the RAID group 30a, the RAID configuration change unit 16 reconstructs the RAID configuration by replacing the unstable RAID member disk 31a with the backup disk 31b corresponding to the unstable RAID member disk 31a.

Thereafter, in Step A32, the backup disk 31b not used in Step A31 is released and returned to the unassigned backup disks 31b. Then, the processing is terminated.

Note that the defective disk 31a and the RAID member disk 31a determined to be unstable in Step A32 are removed from the storage apparatus 1 through maintenance work, and are replaced with new storage devices 31.

Note that the post-processing is described in detail later with reference to FIG. 12.

Figure 9:
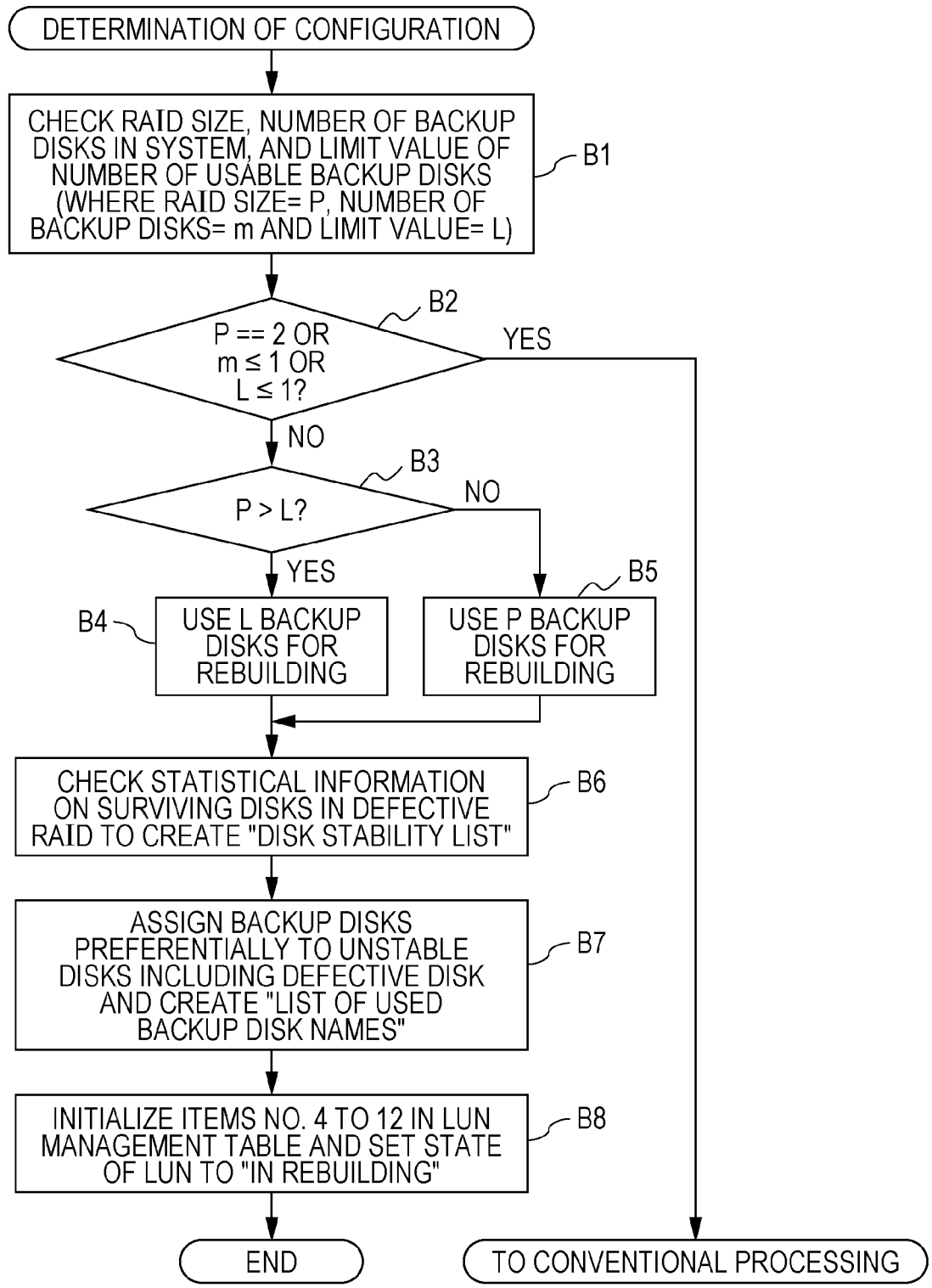
FIG. 9 is a flowchart illustrating a method for determining a storage configuration in the storage apparatus as an example of the embodiment.

Next, with reference to a flowchart (Steps B1 to B8) illustrated in FIG. 9, description is given of the method for determining the storage configuration in the storage apparatus 1 as an example of the embodiment.

In Step B1, the assigning unit 14 checks the RAID size (P), the number of backup disks (m) and the limit value (L).

In Step B2, the assigning unit 14 determines whether or not at least any one of the following three conditions is satisfied: "RAID size P==2", "number of backup disks m≤1." and "limit value L≤1".

When at least one of the three conditions is satisfied as the result of the determination (see YES route in Step B2), the rebuilding unit 13 performs rebuilding using a conventional method. More specifically, the rebuilding unit 13 reconstructs the data of the defective disk 31a by using the data of the rebuilding source disk 31a other than the defective disk 31a in the same RAID group. In this event, assigning of the backup disk 31b to the rebuilding source disk 31a by the assigning unit 14 or copying of the data of the rebuilding source disk 31a to the corresponding alternative disk 31b by the mirroring unit 15 is not performed.

Here, the RAID size P represents the number of the storage devices 31 desired by the RAID. Therefore, "RAID size P==2" means duplexing (mirroring) of RAID1 in the RAID group 30a, and means that rebuilding is not desired. Meanwhile, "number of backup disks m≤1." and "limit value L≤1" mean that the number of backup disks 31b is 1 or 0 and there is no backup disk 31b that may be assigned to the RAID member disk 31a by the assigning unit 14.

On the other hand, when none of the three conditions described above is satisfied as the result of the determination (see NO route in Step B2), it is determined in Step B3 whether or not "RAID size P>limit value L" is true.

When RAID size P>limit value L is true (see YES route in Step B3), L (for example, L=2 as illustrated in FIG. 5) backup disks 31b are used for rebuilding and mirroring.

On the other hand, when RAID size P>limit value L is not true (see NO route in Step B3), P (for example, L=4 as illustrated in FIG. 4 and the like) backup disks 31b are used for rebuilding and mirroring.

Thereafter, in Step B6, the RAID control unit 12 checks storage statistical information of surviving RAID member disks 31a in the RAID group 30a (defective RAID) having trouble with the storage devices 31a. Then, the RAID control unit 12 creates information to be stored as the disk stability list of Item 7 in the LUN management table 61, and registers the created information in the LUN management table 61. The disk stability list is created by sorting the RAID member disks 31a based on the number of errors in each of the RAID member disks 31a, which is acquired as the storage statistical information.

In Step B7, the assigning unit 14 assigns the backup disks 31b preferentially to the unstable RAID member disks 31a including the RAID member disk 31a with trouble. The RAID control unit 12 creates information to be stored as the list of used backup disk names of Item 6 in the LUN management table 61, and registers the created information in the LUN management table 61.

In Step B8, the RAID control unit 12 initializes the contents of Items 4 to 12 in the LUN management table 61, registers "in rebuilding" as the state of LUN of Item 5 in the LUN management table 61, and then terminates the processing.

Figure 10:
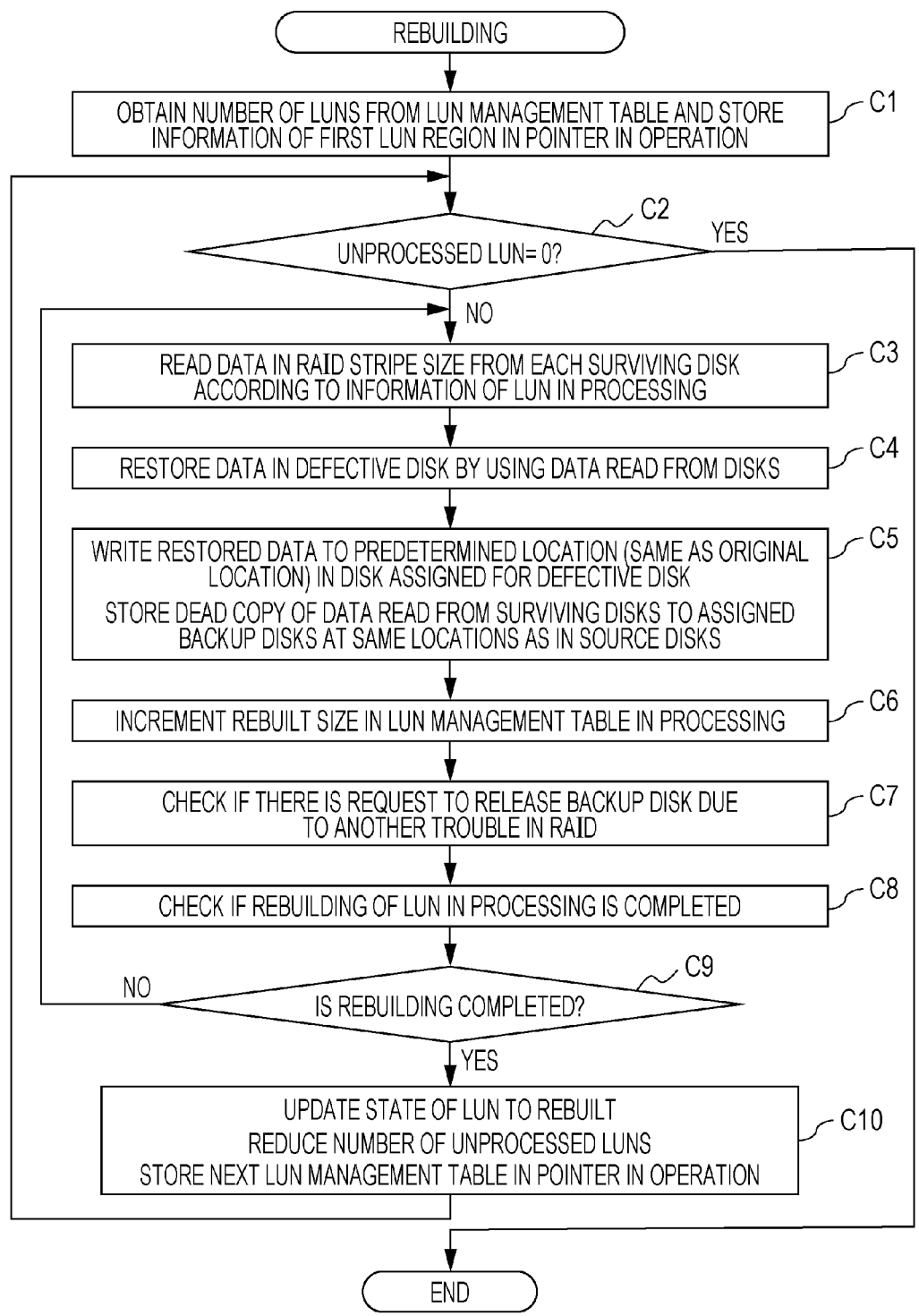
FIG. 10 is a flowchart illustrating the rebuilding in the storage apparatus as an example of the embodiment.

Next, with reference to a flowchart (Steps C1 to C10) illustrated in FIG. 10, description is given of rebuilding in the storage apparatus 1 as an example of the embodiment.

In Step C1, the rebuilding unit 13 acquires the number of LUNs by referring to the LUN management tables 61. Since the LUN management table 61 is created for each LUN, the number of LUNs formed in the RAID group 30a may be known by referring to the number of the LUN management tables 61, for example. Also, the rebuilding unit 13 stores information indicating the first LUN (LUN region) in an unillustrated processing pointer indicating the LUN in processing. By referring to the processing pointer, the progress of the rebuilding may be known.

In Step C2, the rebuilding unit 13 checks the number of unprocessed LUNs by referring to the processing pointer.

When there is one or more unprocessed LUNs (see NO route in Step C2), surviving rebuilding source disks 31a are checked in Step C3 based on the information on the LUNs in processing. Then, data in raid stripe size is read from the surviving rebuilding source disks 31a, and the read data is stored in a predetermined area of the memory 106.

In Step C4, the rebuilding unit 13 restores the defective disk 31a (creates restored data) using the data read from each of the rebuilding source disks 31a.

In Step C5, the rebuilding unit 13 writes the restored data to a predetermined location (same as original location) in the backup disk 31b assigned for the defective disk 31. At the same time, the mirroring unit 15 stores a dead copy of the data read from the surviving rebuilding source disks 31 to the backup disks 31b associated with (assigned to) the rebuilding source disks 31 at the same locations as in the source disks.

In Step C6, the rebuilding unit 13 adds (up) the rebuilt data size (rebuilt size) to the rebuilt size of Item 8 in the LUN management table 61.

In Step C7, the rebuilding unit 13 checks if there is a request to release the backup disk due to another trouble in RAID.

Figure 11:
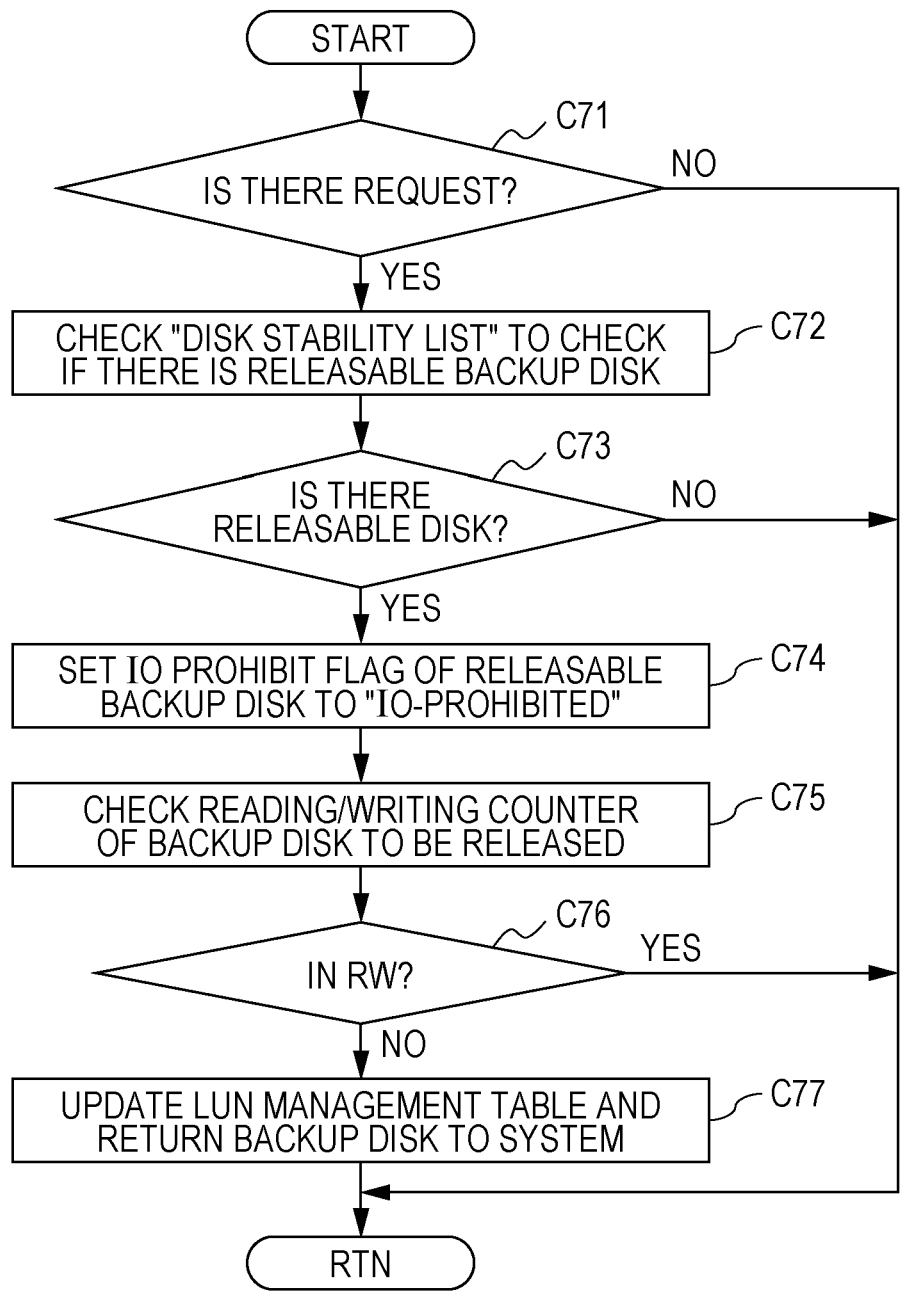
FIG. 11 is a flowchart illustrating details of processing of determining whether or not there is a request to release a backup disk in the storage apparatus as an example of the embodiment.

Here, with reference to a flowchart (Steps C71 to C77) illustrated in FIG. 11, detailed description is given of the processing of checking if there is a request to release the backup disk in Step C7.

In Step C71, it is checked if there is a request to release the backup disk 31 due to another trouble in RAID. When there is no request to release the backup disk 31b from another RAID (see NO route in Step C71), the processing is terminated and moves to Step C8 in FIG. 10.

On the other hand, when there is a request to release the backup disk 31b from another RAID (see YES route in Step C71), the rebuilding unit 13 checks in Step C71 if there is a releasable backup disk 31b by referring to the disk stability list of Item 7 in the LUN management table 61. If the corresponding RAID member disk 31a is stable, the backup disk 31b is less likely to be used as the alternative disk 31b. Therefore, it is considered that there is no problem with releasing the backup disk 31b associated with the RAID member disk 31a with high stability in the disk stability list of Item 7 in the LUN management table 61, and using the backup disk 31b as the backup disk 31b of another storage device 31a.

Therefore, if even one RAID member disk 31a is registered in the disk stability list of Item 7 in the LUN management table 61, it may be determined that there is a releasable backup disk 31b.

When there is a releasable backup disk 31b (see YES route in Step C73) as the result of the determination (Step C73), the rebuilding unit 13 sets an IO prohibit flag of the backup disk 31*b* to be released as the IO prohibit flag of the backup disk of Item 12 in the LUN management table 61 in Step C74. The backup disk 31*b* having the IO prohibit flag set is preferably the backup disk 31*b* corresponding to the RAID member disk 31*a* registered in the top of the disk stability list of Item 7 in the LUN management table 61.

Thus, IO processing of the backup disk 31*b* is prohibited, and there is eventually no IO access. Thus, the backup disk 31*b* can be used.

Thereafter, in Step C75, the rebuilding unit 13 checks a counter value of the backup disk 31*b* in the reading/writing counter of the backup disk of Item 10 in the LUN management table 61.

When the backup disk 31*b* to be released is not in reading nor in writing (in RW) as a result of checking (Step C76), that is, when a value of 1 or more is not stored in any of the reading counter and the writing counter for the backup disk 31*b* to be released (see NO route in Step C76), the processing moves to Step C77.

In Step C77, the rebuilding unit 13 updates the LUN management table 61 by deleting the backup disk 31*b* from the list of used backup disk names of Item 6 in the LUN management table 61. Thus, the rebuilding unit 13 returns the backup disk 31*b* as assignable backup disks 31*b* to the system. Then, the processing is terminated and moves to Step C8 in FIG. 10.

The processing is terminated and moves to Step C8 in FIG. 10 also when there is no releasable backup disk 31*b* (see NO route in Step C73) as the result of the checking in Step C73 or when the backup disk 31*b* to be released is in reading or in writing (in RW) (see YES route in Step C76) as the result of the checking in Step C76.

In Step C8, the rebuilding unit 13 determines whether or not the rebuilding of the LUN in processing is completed. When the rebuilding is not completed (see NO route in Step C9) as a result of checking (Step C9), the processing returns to Step C3.

On the other hand, when the rebuilding is completed (see YES route in Step C9), the processing moves to Step C10.

In Step C10, the rebuilding unit 13 sets the state of LUN of Item 5 in the LUN management table 61 to "rebuilt". Then, the rebuilding unit 13 reduces the number of unprocessed LUNs, and stores a next LUN management table 100 in the processing pointer. Thereafter, the processing returns to Step C2.

When the number of unprocessed LUNs is 0 in Step C2 (see YES route in Step C2), the processing is terminated.

Figure 12:
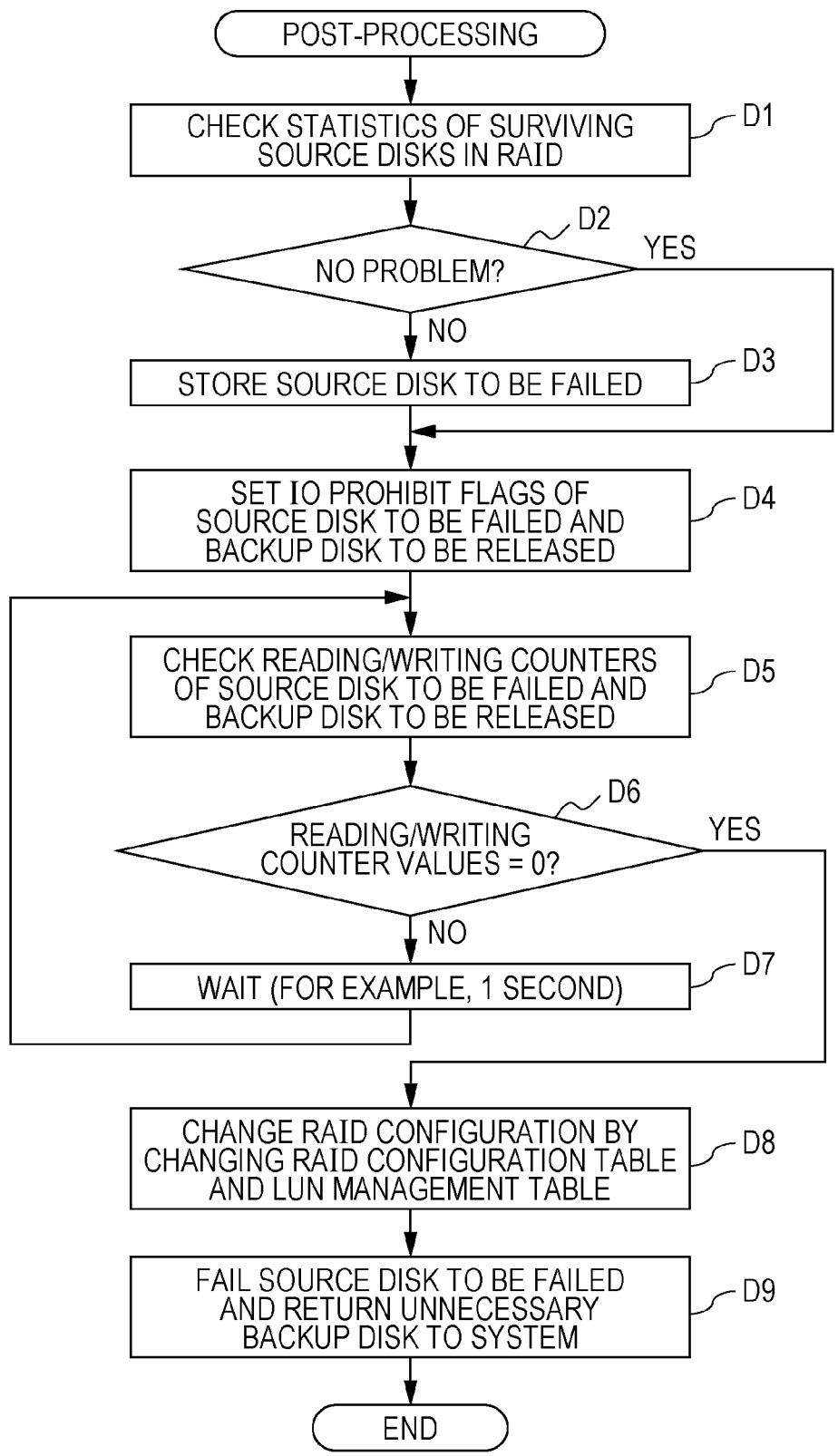
FIG. 12 is a flowchart illustrating processing after the rebuilding in the storage apparatus as an example of the embodiment.

Next, with reference to a flowchart (Steps D1 to D9) illustrated in FIG. 12, description is given of the processing (post-processing) after the rebuilding in the storage apparatus 1 as an example of the embodiment.

In Step D1, the RAID configuration change unit 16 checks if there is a problem with the RAID member disks 31*a* by checking statistical information of the RAID member disks 31*a* other than the defective disk 31*a* subjected to the rebuilding described above.

In Step D2, the RAID configuration change unit 16 checks if there is a problem with the RAID member disks 31*a*. This checking if there is a problem is performed by comparing the number of predetermined errors, such as medium errors or seek errors, with a threshold, for example. When the number of the predetermined errors exceeds the threshold, it may be determined that there is a problem.

When it is determined that there is a problem (see NO route in Step D2) as the result of the determination, the RAID member disk 31*a* determined to have a problem is stored in the memory 106 or the like as a rebuilding source disk (source disk) to be failed, and then the processing moves to Step D4.

On the other hand, when it is determined that there is no problem (see YES route in Step D2) as the result of the determination in Step D2, the processing skips Step D3 and moves to Step D4.

In Step D4, the RAID configuration change unit 16 sets IO prohibit flags of the disk 31*a* to be failed and the backup disk 31*b* to be released. To be more specific, the RAID configuration change unit 16 sets IO prohibit flags of the corresponding storage devices 31*a* in Item 11 in the LUN management table 61. Moreover, the RAID configuration change unit 16 sets IO prohibit flags of the corresponding backup disks 31*b* in Item 12 in the LUN management table 61.

In Step D5, the RAID configuration change unit 16 checks reading/writing counter values of the source disk to be failed and the backup disk to be released by referring to Items 9 and 10 in the LUN management table 61. More specifically, the RAID configuration change unit 16 checks if there is no IO access since the source disk to be failed and the backup disk to be released are not used.

When the reading/writing counter values of the source disk to be failed and the backup disk to be released are not 0 (see NO route in Step D6) as a result of checking (Step D6), the processing returns to Step D5 after waiting for a predetermined time (for example, 1 second) in Step D7.

By setting the IO prohibit flags of the source disk to be failed and the backup disk to be released in Step D4, there is no more new disk access to the disks 31, and the reading/writing counter values eventually become 0.

When the reading/writing counter values of the source disk to be failed and the backup disk to be released are 0 (see YES route in Step D6), the processing moves to Step D8.

In Step D8, the RAID configuration change unit 16 changes the RAID configuration by changing the RAID configuration table 64 and the LUN management table 61.

For example, the RAID configuration change unit 16 registers the backup disk 31*b*, to which the data of the source disk to be failed is copied by the mirroring unit 15, instead of the source disk 31*a* to be failed, in the RAID configuration table 64 and the LUN management table 61. Thus, the RAID configuration change unit 16 reconstructs the RAID configuration by replacing the unstable rebuilding source disks 31*a* in the RAID group 30*a* with the backup disks 31*b*.

Moreover, the RAID configuration change unit 16 deletes the backup disk 31*b* to be released from the list of used backup disks of Item 6 in the LUN management table 61.

In Step D9, the RAID configuration change unit 16 fails the source disk 31*a* to be failed by issuing a command to set the source disk in a failed state. Thus, unnecessary backup disks 31*b* are returned (released) to the system.

Note that, when it is determined in Step D2 described above by the RAID configuration change unit 16 that there is no source disk to be failed, processing to be performed on the source disk to be failed in Steps D4 to D9 is omitted.

Figure 13:
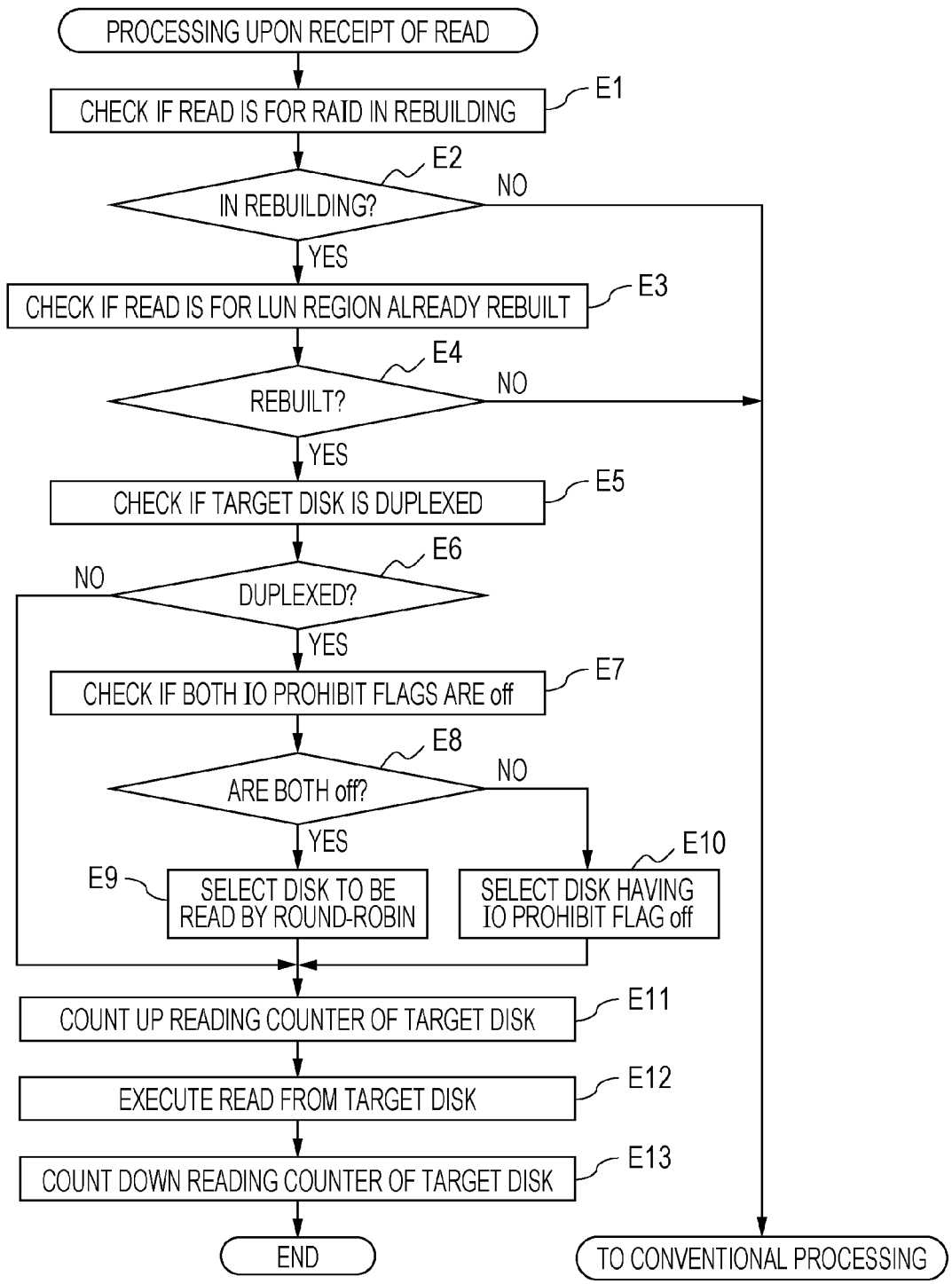
FIG. 13 is a flowchart illustrating processing upon receipt of read in the storage apparatus as an example of the embodiment.

Next, with reference to a flowchart (Steps E1 to E13) illustrated in FIG. 13, description is given of processing upon receipt of read in the storage apparatus 1 as an example of the embodiment.

In Step E1, the IO control unit 11 checks if the received read request is read for the RAID in rebuilding. When the RAID group 30*a* requested for read is in rebuilding (see YES route in Step E2) as a result of checking (Step E2), the IO control unit 11 checks in Step E3 if the received read request is for read from the LUN region already rebuilt.

When the read is for a LUN region that is yet to be rebuilt (see NO route in Step E4) as a result of checking (Step E4) or when the RAID group 30a requested for read is not in rebuilding (see NO route in Step E2), reading is performed using a conventional method.

More specifically, the IO control unit 11 accesses the storage device 31a that is the read request destination to read the requested data, and then transmits the read data to the host device 2. When the read request destination is the defective disk 31a, the IO control unit 11 restores the data of the defective disk 31a by performing an XOR operation using parity on the data of each of the rebuilding source disks 31a other than the defective disk 31a, and then transmits the restored data to the host device 2.

On the other hand, when the read request destination is the LUN region already rebuilt (see YES route in Step E4), the IO control unit 11 checks in Step E5 if the RAID member disk 31a to be accessed is duplexed. In other words, the IO control unit 11 checks if the backup disk 31b is assigned to the RAID member disk 31a to be accessed and a copy of the data of the RAID member disk 31a is stored in the backup disk 31b.

When the RAID member disk 31a to be accessed is duplexed (see YES route in Step E6) as a result of checking (Step E6), the IO prohibit flags in Items 11 and 12 in the LUN management table 61 are checked in Step E7. More specifically, it is checked if the IO prohibit flags of the RAID member disk 31a to be read and the corresponding backup disk 31b are both "0 (off)".

When the IO prohibit flags of the RAID member disk 31a to be read and the corresponding backup disk 31b are both off (see YES route in Step E8) as a result of checking (Step E8), the IO control unit 11 alternately selects one of the RAID member disk 31a and the corresponding backup disk 31b in round-robin fashion in Step E9, thereby selecting the read target disk 31. As described above, when the data of the RAID member disk 31a is duplexed by the backup disk 31b, reading is performed by alternately selecting the RAID member disk 31a and the backup disk 31b. Thus, accesses to each of the disks 31 are dispersed, and the load is reduced. As a result, the life of the storage devices may be extended, and the reliability may be improved.

On the other hand, when both of the IO prohibit flags are not off, that is, when one of the IO prohibit flags of the RAID member disk 31a and the corresponding backup disk 31b is set to on (see NO route in Step E8) as the result of the checking in Step E7, the processing moves to Step E10.

In Step E10, the IO control unit 11 selects one of the RAID member disk 31a and the corresponding backup disk 31b, which has the IO flag set to off, as the read target disk 31.

Thereafter, in Step E11, the IO control unit 11 counts up the reading/writing counter in Item 9 or Item 10 in the LUN management table 61 for the selected read target disk 31. Thus, it may be reduced that the selected read target disk 31 is failed or freed, thereby improving the reliability.

The processing moves to Step E11 also when the RAID member disk 31a to be accessed is not duplexed (see NO route in Step E6) as the result of the checking in Step E5.

In Step E12, the IO control unit 11 executes reading from the read target disk 31. Upon completion of the reading, in Step E13, the IO control unit 11 counts down the reading/writing counter of Item 9 or Item 10 in the LUN management table 61 for the read target disk 31. Then, the processing is terminated.

Figure 14:
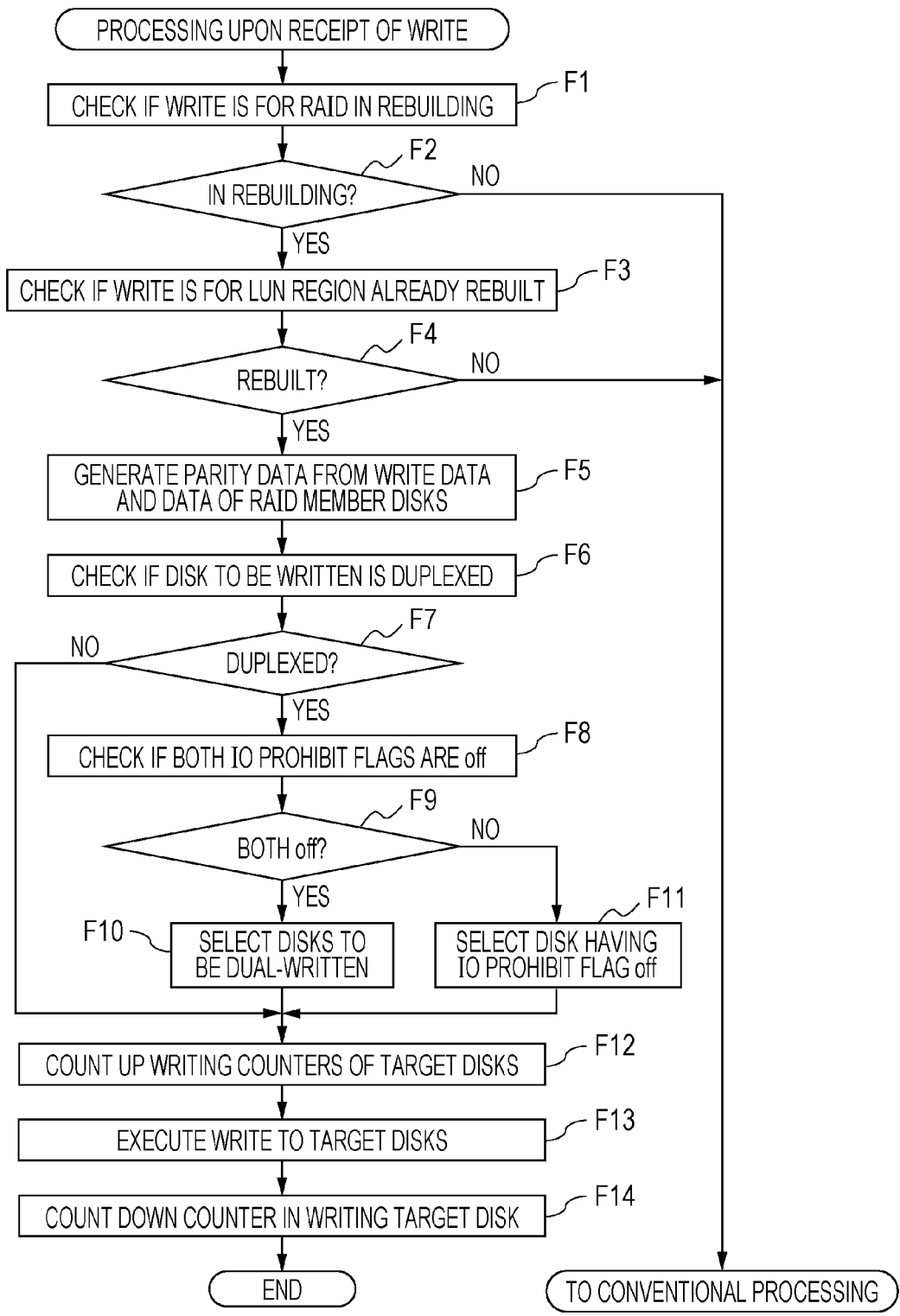
FIG. 14 is a flowchart illustrating processing upon receipt of write in the storage apparatus as an example of the embodiment.

Next, with reference to a flowchart (Steps F1 to F14) illustrated in FIG. 14, description is given of processing upon receipt of write in the storage apparatus 1 as an example of the embodiment.

In Step F1, the IO control unit 11 checks if the received write request is for write for the RAID in rebuilding. When the RAID group 30a that is the write request destination is in rebuilding (see YES route in Step F2) as a result of checking (Step F2), the IO control unit 11 checks in Step F3 if the received write request is for write to the LUN region already rebuilt. When the write is for a LUN region that is yet to be rebuilt (see NO route in Step F4) as a result of checking (Step F4) or when the RAID group 30a that is the write request destination is not in rebuilding (see NO route in Step F2), writing is performed using a conventional method.

More specifically, the IO control unit 11 accesses the storage device 31a that is the write request destination to write the requested data. When the write request destination is the defective disk 31a, the IO control unit 11 restores the data of the defective disk 31a by performing an XOR operation using parity on the data of each of the rebuilding source disks 31a other than the defective disk 31a, and then writes data while comparing the data with the restored data.

On the other hand, when the write request destination is the LUN region already rebuilt (see YES route in Step F4), the IO control unit 11 generates parity data from write data and the data of the RAID member disks in Step F5.

Thereafter, in Step F6, the IO control unit 11 checks if the write target RAID member disk 31a is duplexed. More specifically, the IO control unit 11 checks if the backup disk 31b is assigned for the access target RAID member disk 31a and a copy of the RAID member disk 31a is stored in the backup disk 31b.

When the write target RAID member disk 31a is duplexed (see YES route in Step F7) as a result of checking (Step F7), the IO prohibit flags of Item 11 and Item 12 in the LUN management table 61 are checked in Step F8. In other words, it is checked if the IO prohibit flags of the write target RAID member disk 31a and the corresponding backup disk 31b are both "0 (off)".

When the IO prohibit flags of the write target RAID member disk 31a and the corresponding backup disk 31b are both off (see YES route in Step F9) as a result of checking (Step F9), the IO control unit 11 selects the RAID member disk 31a and the corresponding backup disk 31b as duplexing target disks 31 in Step F10.

On the other hand, when both of the IO prohibit flags are not off, that is, when one of the IO prohibit flags of the RAID member disk 31a and the corresponding backup disk 31b is set to on (see NO route in Step F9) as the result of the checking in Step F8, the processing moves to Step F11.

In Step F11, the IO control unit 11 selects one of the RAID member disk 31a and the corresponding backup disk 31b, which has the IO flag set to off, as the write target disk 31.

Thereafter, in Step F12, the IO control unit 11 counts up the reading/writing counter in Item 9 or Item 10 in the LUN management table 61 for the selected write target disk 31. Thus, it may be reduced that the selected write target disk 31 is failed or freed, thereby improving the reliability.

The processing moves to Step F12 also when the RAID member disk 31a is not duplexed (see NO route in Step F7) as the result of the checking in Step F6.

In Step F13, the IO control unit 11 executes writing to the write target disk 31. Upon completion of the writing, in Step F14, the IO control unit 11 counts down the reading/writing counter of Item 9 or Item 10 in the LUN management table 61 for the write target disk 31. Then, the processing is terminated.

As described above, according to the storage apparatus 1 as an example of the embodiment, the mirroring unit 15 creates a copy of the RAID member disk 31a in the backup disk 31b corresponding to the RAID member disk 31a, and thus the data of each of the RAID member disks 31a may be made redundant. Accordingly, even when there is trouble with the RAID member disks 31a, losing of the entire data within the RAID may be reduced by reconstructing the RAID configuration using the backup disks 31b. As a result, the reliability may be improved.

Moreover, the rebuilt LUN may be immediately returned to a data protection state, since the influence of performance degradation due to rebuilding is reduced.

During reading, reading is performed by alternately selecting the redundant data of the RAID member disk 31a and the data of the backup disk 31b in round-robin fashion. Thus, high storage accessibility may be realized even in rebuilding. Furthermore, during reading, the load may be dispersed by evenly using the redundant RAID member disk 31a and the backup disk 31b.

When an unstable RAID member disk 31a is detected in the RAID group 30a upon completion of the rebuilding, the RAID configuration change unit 16 reconstructs the RAID configuration by replacing the unstable RAID member disk 31a with the corresponding backup disk 31b. Thus, trouble with the RAID member disk 31a may be reduced beforehand. As a result, the reliability may be improved.

The mirroring unit 15 makes a dead copy of the data read from the rebuilding source disk 31a to the memory 106 during rebuilding to the backup disk 31b corresponding to the rebuilding source disk 31a. Thus, the copy of the rebuilding source disk 31a may be easily created in the backup disk 31b. This saves special control by the CPU 110 or the like in the storage controller 100. Thus, the load on the storage controller 100 is not increased, and a processing speed is not lowered.

The disclosed technology is not limited to the embodiment described above, but may be implemented by making various changes thereto without departing from the spirit of the embodiment. The configurations and processes according to the embodiment may be selected or combined as appropriate.

In the above embodiment, for example, the description is given of the example where rebuilding is performed when the rebuilding unit 13 detects a problem in any of the storage devices 31a. However, the embodiment is not limited thereto. For example, when a problem is predicted to occur in any of the storage devices 31a, rebuilding may be performed using the storage device 31a predicted to have a problem as the defective disk 31a. Alternatively, in terms of preventive maintenance or the like, rebuilding may be performed using a normal storage device 31a as the defective disk 31a.

Moreover, in the above embodiment, the description is given of the example where the RAID group 30a realizes RAID5 using four (3+1) RAID member disks 31a. However, the embodiment is not limited thereto. For example, the embodiment may be implemented by changing the configuration to RAID2 to RAID4, RAID50 (5+0), RAID6, RAID10 or the like, for example.

Furthermore, in the above embodiment, the IO control unit 11 performs reading by alternately selecting the RAID member disks 31a in the RAID group 30a and the backup disks 31b in the backup disk group 30b in a round-robin fashion. However, the embodiment is not limited thereto. Specifically, data read does not have to be alternately performed from the RAID member disk 31a and the backup disk 31b, in which the copy of the RAID member disk 31a is stored. The data read may be evenly performed to enable dispersion of the load as a result.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage controller communicably coupled to a plurality of redundant storage devices having a redundant configuration and a plurality of backup storage devices through a communication path, the storage controller comprising:
   at least one memory that stores instructions, and
   at least one hardware processor that causes, by executing the instructions, the storage controller to:
   perform a reconstruction including:
      creating first data for a defective redundant storage device to be restored among the plurality of redundant storage devices by using second data read from other redundant storage devices among the plurality of redundant storage devices, and
   storing the created first data into at least one first backup storage device among the plurality of backup storage devices, and
   while performing the reconstruction, copy the second data read from the other redundant storage devices into at least one second backup storage device assigned to the other redundant storage devices from among the plurality of backup storage devices.

2. The storage controller according to claim 1, wherein the at least one hardware processor further causes the storage controller to:
   read data from the at least one first backup storage device storing the first data, and from either the other redundant storage devices or the at least one second backup storage device storing the second data read from the other redundant storage devices, in response to receiving a read request from a host device.

3. The storage controller according to claim 1, wherein the at least one hardware processor further causes the storage controller to write data into the at least one first backup storage device storing the first data, and into both the other redundant storage devices and the at least one second backup storage devices storing the second data read from the other redundant storage devices, in response to receiving a write request from the host device.

4. The storage controller according to claim 1, wherein:
   the at least one hardware processor further causes the storage controller to,
      in response to the reconstruction, assign the at least one second backup storage device to at least one of the other redundant storage devices for the defective redundant storage device, and copy the second data read from the other redundant storage devices into the assigned at least one second backup storage device.

5. The storage controller according to claim 4, wherein in response to a number of a plurality of backup storage devices assignable to the plurality of redundant storage devices being smaller than a number of the plurality of redundant storage devices, the at least one second backup storage device is preferentially assigned to at least one of the other redundant storage devices with low stability.

6. The storage controller according to claim 1, wherein the at least one hardware processor further causes the storage controller to:
change a redundant configuration of the plurality of redundant storage devices by replacing an unstable redundant storage device with low stability among the other redundant storage devices with one of the assigned at least one second backup storage device having a copy of the second data read from the unstable redundant storage device, after the reconstruction is completed.

7. A storage system comprising:
a plurality of redundant storage devices having a redundant configuration;
a plurality of backup storage devices;
a storage controller communicably coupled to the plurality of storage devices and the backup storage devices, and including at least one memory that stores instructions, and at least one hardware processor that causes, by executing the instructions, the storage controller to:
perform a reconstruction including:
creating first data for a defective redundant storage device to be restored among the plurality of redundant storage devices by using second data read from other redundant storage devices among the plurality of redundant storage devices, and
storing the created first data into at least one first backup storage device among the plurality of backup storage devices, and
while performing the reconstruction, copy the second data read from the other redundant storage devices into at least one second backup storage device assigned to the other redundant storage devices from among the plurality of backup storage devices.

8. The storage system according to claim 7, wherein the at least one hardware processor further causes the storage controller to:
read data from the at least one first backup storage device storing the first data, and from either the other redundant storage devices or the at least one second backup storage device storing the second data read from the other redundant storage devices, in response to receiving a read request from a host device.

9. The storage system according to claim 7, wherein the at least one hardware processor further causes the storage controller to write data into the at least one first backup storage device storing the first data, and into both the other redundant storage devices and the at least one second backup storage device storing the second data read from the other redundant storage devices, in response to receiving a write request from the host device.

10. The storage system according to claim 7, wherein:
the at least one hardware processor further causes the storage controller to,
in response to the reconstruction, assign the at least one second backup storage device to at least one of the other redundant storage devices for the defective redundant storage device, and
copy the second data read from the other redundant storage devices into the assigned at least one second backup storage device.

11. The storage controller according to claim 10, wherein in response to a number of a plurality of backup storage devices assignable to the plurality of redundant storage devices being smaller than a number of the plurality of redundant storage devices, the at least one second backup storage device is preferentially assigned to the at least one of the other redundant storage devices with low stability.

12. The storage system according to claim 7, wherein the at least one hardware processor further causes the storage controller to:
change a redundant configuration of the plurality of redundant storage devices by replacing an unstable redundant storage device with low stability among the other redundant storage devices with one of the assigned at least one second backup storage device having a copy of the second data of read from the unstable redundant storage device, after the reconstruction for the defective redundant storage device is completed.

13. A control method for a storage apparatus with a plurality of redundant storage devices having a redundant configuration and a plurality of backup storage devices, the method comprising:
by at least one hardware processor that causes, by executing instructions stored in at least one memory, the storage apparatus to:
perform a reconstruction including:
creating first data for a defective redundant storage device to be restored among the plurality of redundant storage devices by using second data read from other redundant storage devices among the plurality of redundant storage devices, and
storing the created first data into at least one first backup storage device among the plurality of backup storage devices; and
while performing the reconstruction, copy the second data read from the other redundant storage devices into at least one second backup storage device assigned to the other redundant storage devices' from among the plurality of backup storage devices.

* * * * *